United States Patent
Borke et al.

(10) Patent No.: US 9,645,561 B2
(45) Date of Patent: May 9, 2017

(54) OPTIMIZING A DISPENSING PARAMETER OF A PRODUCT DISPENSER BASED ON PRODUCT USAGE DATA

(71) Applicant: Georgia-Pacific Consumer Products LP, Atlanta, GA (US)

(72) Inventors: Brian Scott Borke, Appleton, WI (US); Antonio Michael Cittadino, Appleton, WI (US); David Warren Murphy, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 67 days.

(21) Appl. No.: 14/604,232

(22) Filed: Jan. 23, 2015

(65) Prior Publication Data
US 2016/0214817 A1    Jul. 28, 2016

(51) Int. Cl.
*G05B 15/02* (2006.01)
*A47K 5/12* (2006.01)
(Continued)

(52) U.S. Cl.
CPC ............ *G05B 15/02* (2013.01); *A47K 5/1217* (2013.01); *A47K 10/36* (2013.01);
(Continued)

(58) Field of Classification Search
CPC .. B65H 20/005; B65H 20/00; B65H 2220/01; A47K 10/36; A47K 10/38; A47K 2010/3226
See application file for complete search history.

(56) References Cited

U.S. PATENT DOCUMENTS 5,882,743 A  *  3/1999  McConnell ............ A47K 10/16
                                                    428/12
6,695,246 B1     2/2004  Elliott et al.
(Continued)

FOREIGN PATENT DOCUMENTS

WO    WO/2008/042382 A2    4/2008

OTHER PUBLICATIONS

International Search Report and Written Opinion for International Application No. PCT/US2016/013608, mailed May 2, 2016.

*Primary Examiner* — Timothy Waggoner
(74) *Attorney, Agent, or Firm* — Nelson Mullins Riley & Scarborough LLP

(57) ABSTRACT

Systems, methods, and computer-readable media are disclosed for optimizing a value of a dispensing parameter of a product dispenser based at least in part on product usage data. The dispensing parameter may include any suitable adjustable parameter of the product dispenser including, but not limited to, a dispense duration, a volume of product (e.g., a shot size), a sheet length, a capability of a user sensor to distinguish between genuine and false triggers of the sensor, a delay setting that specifies a delay time between successive dispenses, or the like. The value of the dispensing parameter may be optimized to align an actual performance outcome with a target performance outcome. The target performance outcome may include, for example, minimizing product usage per user, maximizing user sensor reliability (e.g., a percentage of dispenses that occur in response to genuine user-initiated triggering events), and so forth.

24 Claims, 9 Drawing Sheets

(51) Int. Cl.
*A47K 10/36* (2006.01)
*A47K 10/32* (2006.01)
*A47K 10/38* (2006.01)

(52) U.S. Cl.
CPC .. *A47K 10/3625* (2013.01); *A47K 2010/3266* (2013.01); *A47K 2010/3668* (2013.01); *A47K 2010/3881* (2013.01)

(56) References Cited

U.S. PATENT DOCUMENTS

| | | | |
|---|---|---|---|
| 6,727,818 B1 * | 4/2004 | Wildman | G06F 19/3418 340/10.1 |
| 6,988,689 B2 | 1/2006 | Thomas et al. | |
| 7,594,622 B2 | 9/2009 | Witt et al. | |
| 7,726,599 B2 * | 6/2010 | Lewis | A47K 5/06 242/563 |
| 7,783,380 B2 | 8/2010 | York et al. | |
| 8,231,075 B2 | 7/2012 | Troutman et al. | |
| 8,231,076 B2 | 7/2012 | Troutman et al. | |
| 8,434,709 B2 | 5/2013 | Troutman et al. | |
| 8,600,547 B2 * | 12/2013 | Petersen | A47K 10/36 700/236 |
| 8,919,688 B2 | 12/2014 | Kuehneman et al. | |
| 9,437,103 B2 * | 9/2016 | Ophardt | A47K 5/1202 |
| 2005/0171634 A1 * | 8/2005 | York | A47K 5/06 700/231 |
| 2006/0173576 A1 * | 8/2006 | Goerg | A47K 10/3845 700/236 |
| 2007/0080255 A1 | 4/2007 | Witt et al. | |
| 2008/0077440 A1 | 3/2008 | Doron | |
| 2009/0069930 A1 | 3/2009 | Peters et al. | |
| 2010/0089939 A1 | 4/2010 | Morris et al. | |
| 2010/0269653 A1 | 10/2010 | Larsson | |
| 2013/0018506 A1 | 1/2013 | Cittadino | |
| 2014/0008346 A1 | 1/2014 | Zhu et al. | |
| 2014/0158809 A1 | 6/2014 | Borke | |

\* cited by examiner

OPTIMIZING A DISPENSING PARAMETER OF A PRODUCT DISPENSER BASED ON PRODUCT USAGE DATA

BACKGROUND

Users may utilize product dispensers that dispense a variety of types of products such as, for example, sheet products, solids, liquids, gases, or products that include—or exhibit characteristics of—multiple phases of matter such as gels, aerosols, foams, and so forth. An automated product dispenser, for example, may be configured to dispense a quantity of a product in response to detection of the movement or presence of an object (e.g., a user's hand) by a sensor. As another example, an automated product dispenser may operate in "hang-mode" and may include a tear sensor that detects when a product, such as a sheet product, has been separated from a product roll and generates a signal that causes the dispenser to dispense additional sheet product of a predetermined length. Various settings for controlling the operation of a product dispenser may be configurable such as, for example, an incremental amount of the product dispensed during each dispensing cycle.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
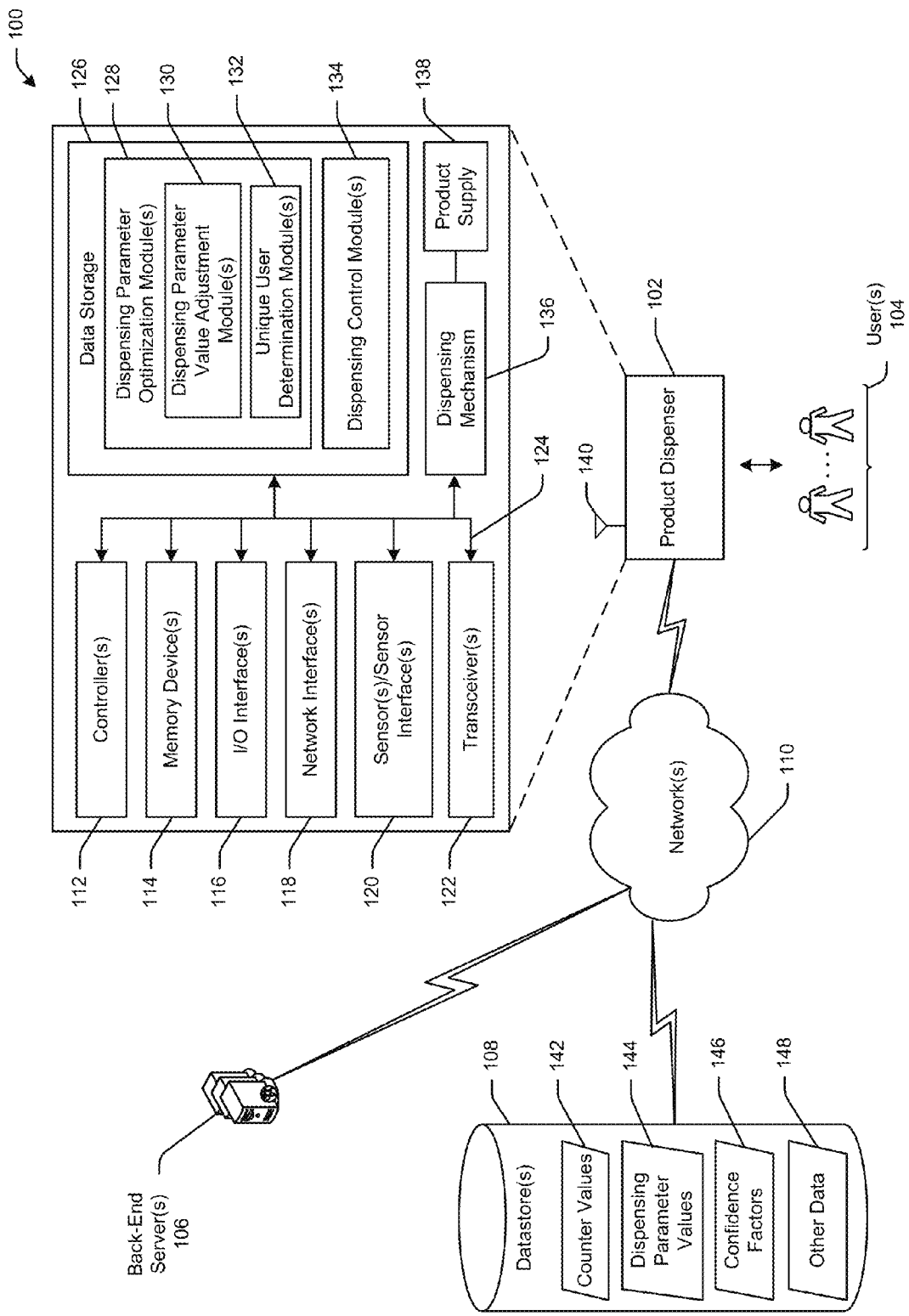
FIG. 1 is a diagram depicting a schematic representation of an illustrative product dispenser and an illustrative networked architecture that includes the product dispenser in accordance with one or more example embodiments of the disclosure.

This disclosure relates to, among other things, devices, systems, methods, computer-readable media, techniques, and methodologies for optimizing a value of a dispensing parameter of a product dispenser based at least in part on product usage data. The dispensing parameter may include any suitable adjustable parameter of the product dispenser including, but not limited to, a dispense duration, a volume of product (e.g., a shot size), a sheet length, a product concentration, a capability of a user sensor to distinguish between genuine and false triggers of the sensor, a delay setting that specifies a delay time between successive dispenses, or the like. The value of the dispensing parameter may be optimized to align an actual performance outcome with a target performance outcome. The target performance outcome may include, for example, minimizing product usage per user, maximizing user sensor reliability (e.g., a percentage of dispenses that occur in response to genuine user-initiated triggering events), and so forth.

In an example embodiment, a product dispenser may be configured to dispense a certain quantity of a product during each dispensing cycle of the dispenser. The product dispenser may be an automated product dispenser that may include a user sensor, a dispensing mechanism, and a controller configured to generate a signal to actuate the dispensing mechanism to dispense a predetermined amount of product in response to a dispense signal generated by the user sensor. More specifically, the user sensor may generate a dispense signal in response to a triggering event, and the dispense signal may be received by the controller, which may then generate an actuation signal to actuate the dispensing mechanism to dispense the predetermined amount of product. While example embodiments of the disclosure may be described in the context of automated product dispensers, it should be appreciated that such embodiments may be applicable to mechanical/manually operated product dispensers, air blowers, and so forth.

The user sensor may be, for example, a photo sensor that includes a light source that generates a beam of focused light and a light sensor that detects a disruption in the light beam caused by an object (e.g., a user's hand) and generates a dispense signal in response to the detected disruption. As another example, the user sensor may be a radar-based sensor that transmits bursts of microwave or ultrasound energy and analyzes a pattern of the reflected energy to determine whether a triggering event has occurred. The presence of an object (e.g., a user's hand) may cause the reflected energy to exhibit an irregular pattern, and the user sensor may generate a dispense signal in response to this detected irregular pattern. As yet another non-limiting example, the user sensor may be a passive infrared sensor that detects infrared energy emitted by an object. When an object (e.g., a user's hand) is in proximity of the sensor, the infrared energy detected by the sensor may fluctuate, causing the sensor to generate a dispense signal. As still another example, the product dispenser may operate in "hang-mode" in which removal of a length of sheet product exposed from an opening of the dispenser may cause a tear sensor of the dispenser to generate a dispense signal which, in turn, may cause another predetermined length of sheet product to be dispensed through the opening of the dispenser. Other example types of sensors may include, without limitation, active infrared sensors, capacitive sensors, and so forth. It should be appreciated that the above examples of types of sensors that may be employed is merely illustrative and not exhaustive.

It should further be appreciated that a product dispenser that includes a user sensor (e.g., a motion sensor, user proximity sensor, or the like) and dispenses product in response to a signal generated by the user sensor (e.g., an "on-demand" dispenser) may nonetheless also include a tear sensor that generates and sends a tear signal to the controller upon detection of a tear event. However, unlike a "hang-mode" dispenser, the controller of an "on-demand" dispenser may not initiate a dispensing cycle (e.g., energize a motor of the dispenser) responsive to receipt of the tear signal.

The dispensing mechanism of the product dispenser may include a motor that is energized by a power source (e.g., a battery) in response to an actuation signal received from a controller of the dispenser. Upon being energized, the motor may actuate a pumping mechanism and/or one or more other components of the dispensing mechanism (e.g., mechanical rollers) to cause an amount of product to be dispensed as part of a dispensing cycle. A dispensing cycle may refer to a particular instance in which the motor is energized and other component(s) of the dispensing mechanism are actuated to cause a predetermined amount of a product to be dispensed. It should be appreciated that, in certain example embodiments, less than the predetermined amount of a product may be dispensed during a dispensing cycle. For example, user behavior may cause the dispensing cycle to end prematurely before the predetermined amount of product is dispensed. For example, a user may tear off a sheet product from a sheet product dispenser before a predetermined amount of sheet length is dispensed, thereby prematurely halting the dispensing cycle and triggering a tear sensor of the product dispenser to generate a tear signal that causes the dispenser (if the dispenser is operating in "hang-mode") to dispense an additional predetermined amount of the product as part of a subsequent dispensing cycle.

Figure 6:
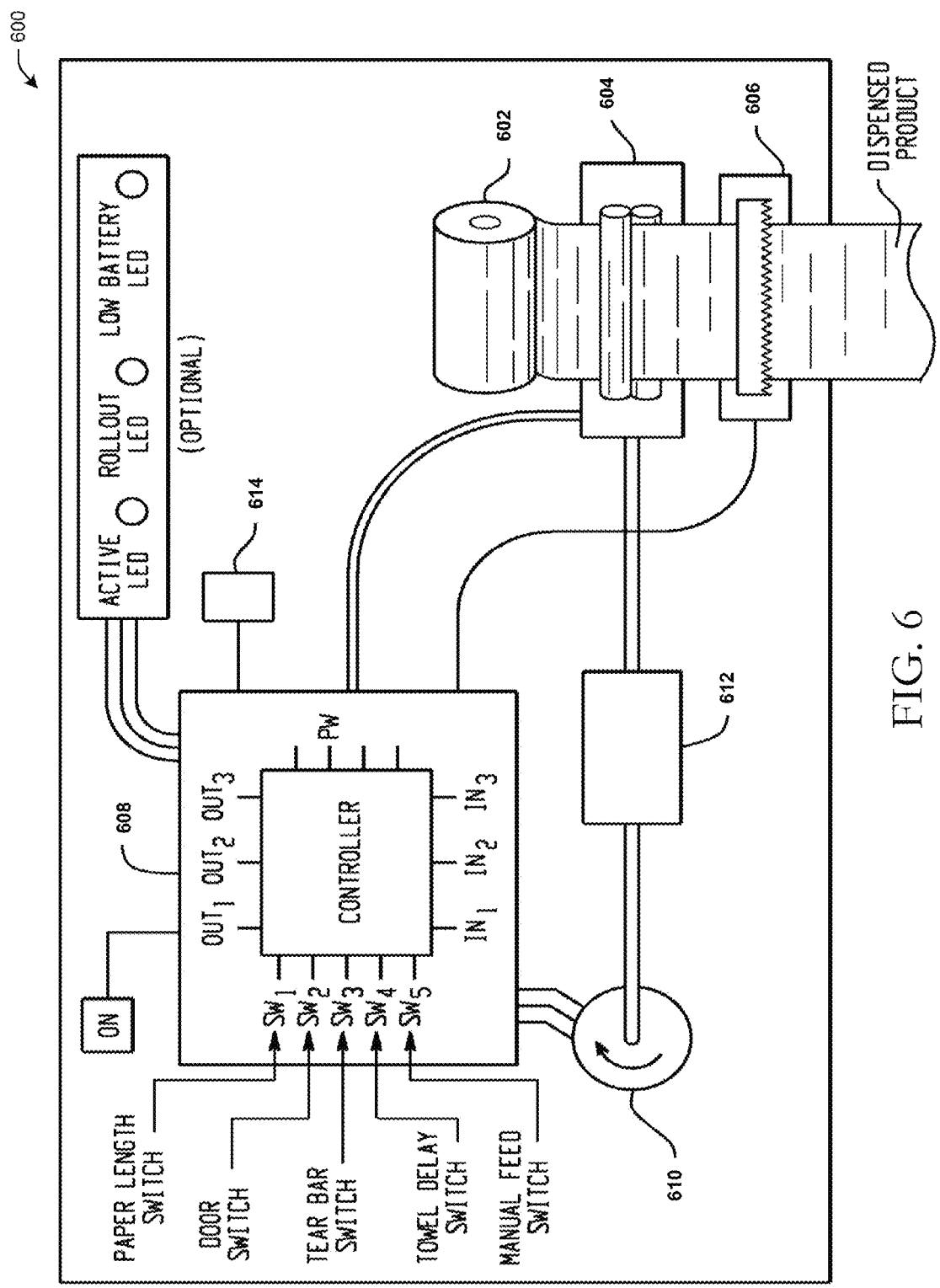
FIG. 6 is a schematic depiction of an example sheet product dispenser in accordance with one or more example embodiments of the disclosure.
Figure 7:
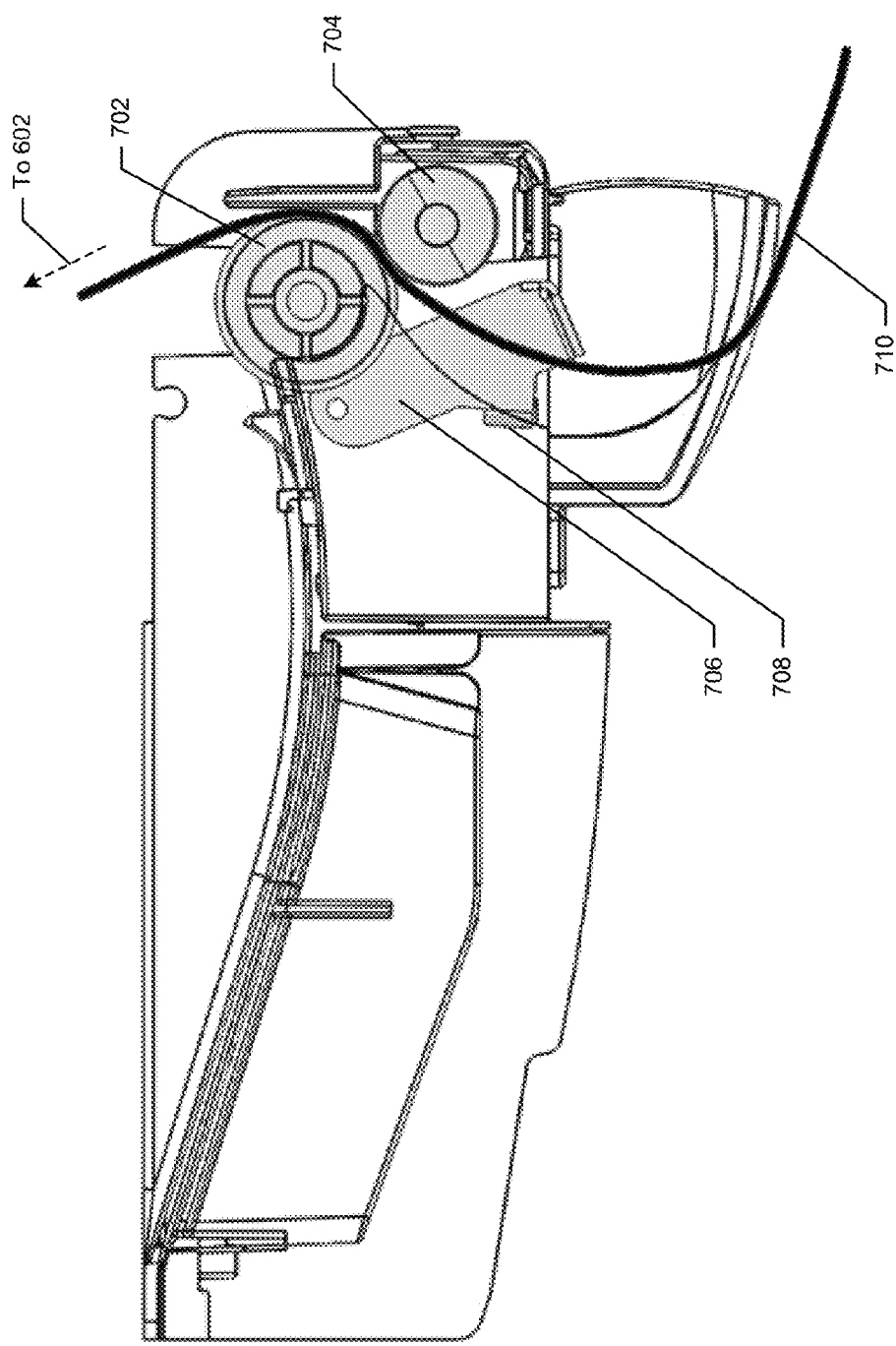
FIG. 7 is an illustrative depiction of a portion of an example sheet product dispenser in accordance with one or more example embodiments of the disclosure.

Referring to FIG. 6, an example sheet product dispenser 600 may include a sheet product supply, such as a roll 602 of sheet product (e.g., tissue or paper towel) and a feed mechanism 604 for moving sheet product within and out of the dispenser 600. The feed mechanism 604 (depicted in more detail in FIG. 7) may include a drive roller 702, a pinch roller 704 positioned in close proximity to the drive roller 702 to form a pinch or "nip" there between. The roll 602 of sheet product may be supported on roll holders apart from the drive roller 702 and the pinch roller 704, and a free end of the roll 602 may be threaded through the nip formed between the drive roller 702 and the pinch roller 704. The product dispenser 600 may be adapted for hands-free operation for dispensing one or more rolls 602 of sheet product.

The dispenser 600 may include a motor 610 and a transmission 612. The motor 610 may be, for example, a brushed direct current (DC) motor, a DC stepper motor, or the like. The transmission 612 may include any combination of gears, pulleys, belts, or the like for transferring rotational forces from the motor 610 to the feed mechanism 604. In an example embodiment, the transmission 612 may include a motor shaft that couples the motor 610 to the drive roller 702. The motor 610 may be powered by a power supply (not shown), such as a battery pack or external AC (e.g., with an appropriate transformer and adapter) or a DC power supply. Moreover, the dispenser 600 may be configured to be switched between battery power and AC power.

In operation, in response to an actuation signal generated by a controller 608 of the dispenser 600, a power supply may energize the motor 610 which may, in turn, actuate the drive roller 702 via the transmission 612. The actuation signal may be generated in response to a signal received from a user sensor 614 of the dispenser 600. Rotation of the drive roller 702 may cause the pinch roller 704 to rotate, thereby causing the sheet product to be pulled from the roll 602 through the nip formed between the drive roller 702 and the pinch roller 704 under the force of friction.

If the dispenser 600 is operating in hang-mode for example, the dispenser 600 may be configured to dispense sheet product in response to a signal received from a tear sensor of the dispenser 600. As depicted in FIG. 6 and in more detail in FIG. 7, the dispenser 600 may include a tear assembly 606 that may, in turn, include a tear bar 706 pivotably mounted to a body of the dispenser 600 and a switch 708 in communication with the controller 608. In operation, to remove a portion 710 of the sheet product roll 602, a user may apply a force on the portion 710 which may cause the portion 710 to engage the tear bar 706 and cause the tear bar 706 to pivot into contact with the switch 708. Upon engagement with the tear bar 706, the switch 708 may generate a signal indicating that a tear operation has taken place, which may be communicated to the controller 608. Upon receipt of this signal, the controller 608 may generate an actuation signal to cause a dispensing cycle to occur. It should be appreciated that in cases where perforated paper is dispensed, the tear bar 706 may be omitted.

In other example embodiments, the tear assembly 606 may include a stationary tear bar, a tear bail, and a switch in communication with the controller 606. In such example embodiments, in operation, to remove the portion 710 of the sheet product roll 602, a user may apply a force on the portion 710 against the stationary tear bar. As the portion 710 is pulled against the tear bar, contact may be made between the product sheet and the tear bail causing the tear bail to rotate into contact with the switch. Upon engagement with the tear bail, the switch may generate a signal indicating that a tear operation has taken place, which may then be communicated to the controller 608. It should be appreciated that a variety of other configurations and modes of operation are possible for the tear assembly 606.

The controller 608 may be any suitable controller such as, for example, a microcontroller. Example microcontrollers include, but are not limited to, an MSP430 Ultra-Low-Power microcontroller manufactured by Texas Instruments™, a proportional integral differential (PID) microcontroller configured to implement various stepper motor control techniques. Microchip, Inc.'s™ CMOS FLASH-based 8-bit microcontroller, or the like. Inputs to the controller 608 may include a battery voltage signal, a tear bar activation signal, a cover switch signal, a paper length switch signal, a towel delay switch signal, a manual advance switch signal, and an ON switch signal. Outputs of the controller 608 may include motor control signals and LED signals. Motor control signals may be used to control the motor 610, and thus, the speed at which sheet product is moved by feed mechanism 604 as described herein.

In other example embodiments of the disclosure, a product dispenser may dispense solids, liquids, gases, or products that include—or exhibit characteristics of—multiple phases of matter such as gels, aerosols, foams, and so forth. For example, the product dispenser may be a soap dispenser. Such example product dispensers may include a product container for storing the product such as, for example, a bag or bottle. Such example product dispensers may further include a controller, a pump, and a motor. In response to an actuation signal received from the controller, the motor may actuate the pump to cause the pump to dispense a predetermined amount of the product (e.g., volume of product, weight of product, etc.) from the container.

In an example embodiment, a product dispenser may be initially configured to dispense a predetermined amount of a product in accordance with an initial value of a dispensing parameter. Referring to a sheet product length dispensing parameter solely for explanatory purposes, the sheet length may be pre-programmed to an initial value for an initial dispensing period. Alternatively, the initial value may be set manually using a physical button or switch or via user interaction with a user interface (e.g., a touch screen interface) of the product dispenser. It should be appreciated that the first and second dispensing periods may represent an initial dispensing period and a dispensing period that immediately follows the initial dispensing period, respectively, or may represent any two dispensing periods associated with operation of a product dispenser. The first and second dispensing periods may be consecutive or non-consecutive dispensing periods.

During the first dispensing period, a first number of dispensing cycles may be triggered, where each dispensing cycle may involve the dispensing of an amount of the product sheet corresponding to a first value of the dispensing parameter (which may be a pre-programmed initial value if, for example, the first dispensing period is an initial dispensing period). For some users, the sheet length corresponding to the first value may be sufficient to meet their needs. However, for other users, the sheet length corresponding to the first value may be insufficient to meet their needs, in which case, such users may trigger one or more additional dispensing cycles to obtain additional amounts of sheet product. A user that triggers multiple dispensing cycles may in actuality, however, require an intermediate amount of sheet product that is less than what is dispensed as part of the multiple dispensing cycles. For example, a sheet length of 12 inches may be insufficient for a particular user, in which case, the user may trigger two dispenses of the sheet product resulting in a total of 24 inches of sheet product being dispensed. A sheet length of 16 inches may, however, may have been sufficient to meet the needs of the user. As such, the additional 8 inches of sheet product that is dispensed may constitute a waste of product.

Accordingly, example embodiments of the disclosure are directed to processes for optimizing a value of a dispensing parameter (such as sheet product length) to minimize overall usage of the product across an aggregate number of users of a product dispenser who may exhibit varying user behavior with respect to the amount of product needed to meet their consumption needs. Optimization processes disclosed herein may be performed responsive to execution of executable instructions, code, or the like by a controller of a product dispenser and/or by one or more processing units that may be provided in a remote environment from a local environment in which the dispenser is provided. The executable instructions, code, or the like may be stored on local data storage of the product dispenser and/or may be stored on one or more remote storage media.

Still referring to the example embodiment introduced above, a first counter of the accumulated value of the dispensing parameter during the first dispensing period may be maintained. For example, the first counter may represent the total amount of sheet product dispensed during the first dispensing period. In certain example embodiments, the first counter may be incremented by the first value of the dispensing parameter after each dispense that occurs during the first dispensing period.

The value of a dispensing parameter that is used to increment the counter that represents an accumulated amount of product dispensed during a dispensing period may be a pre-programmed value (as may be the case with the initial dispensing period), a value calculated in accordance with an optimization process disclosed herein, or a directly measured value. If the value is measured, any of a variety of techniques may be used to obtain the measurement depending on the type of dispensing parameter. For example, if the dispensing parameter is sheet length, a number of revolutions of mechanical rollers of the product dispenser may be used to determine the sheet length dispensed. As another example, if the dispensing parameter is dispense duration, an amount of time that elapses between activation of the dispensing mechanism and deactivation of the dispensing mechanism may be measured. More particularly, in certain example embodiments, an amount of time that a motor of the product dispenser is activated may be measured and used as the dispense duration or correlated to a particular sheet length. Due to reduced power capacity of a power source of the dispenser (e.g., one or more batteries) over time, the motor may need to run for an increasingly longer period of time in order to dispense a same amount of product to satisfy user demands. As such, the techniques and methodologies disclosed herein for optimizing a value of a dispensing parameter, such as motor run time, can be used to automatically adjust (e.g., increase) the motor run time in order to achieve a target performance outcome such as minimizing product usage per user. Measuring the value of the dispensing parameter (rather than using a pre-programmed value or a calculated value) may be appropriate in those scenarios in which a user prematurely halts a dispensing cycle and retrieves less than the predetermined amount of product such as, for example, when a user tears dispensed sheet product before the entire predetermined amount of sheet product is dispensed.

Still referring to the example embodiment introduced above, a second counter of an estimated number of unique users that received dispenses during the first dispensing period may also be maintained. In certain example embodiments, a predetermined period of time (e.g., 10 seconds) may be used to determine whether any two dispenses were triggered by the same user or different users. For example, if a given dispense occurred within the predetermined period of time of a previous dispense, the given dispense and previous dispense may be determined to have been triggered by the same user. Conversely, if two dispenses occurred more than the predetermined period of time apart from each other, they may be attributed to different users. In this manner, a second counter of the number of unique users that received dispenses during the first dispensing period may be maintained. As will be described in more detail later in this disclosure, the estimate of the number of unique users that used the dispenser during a dispensing period may be refined through the use of a confidence factor in order to arrive at a more accurate estimate of the actual number of users. The confidence factor may represent the approximate likelihood that two dispenses that occurred within the predetermined period of time are attributable to the same user and may be determined using one or more statistical techniques.

The final values of the first and second counters may then be stored at the completion of the first dispensing period. The occurrence of any of a variety of conditions may determine when a dispensing period ends. For example, a dispensing period may end when it is determined that a threshold number of unique users have received dispenses during the dispensing period. As another non-limiting example, a dispensing period may end after a threshold period of time has elapsed. As yet another example, a dispensing period may end after a threshold number of dispensing cycles have occurred.

At any time after the conclusion of the first dispensing period, a second dispensing period may be initiated. As previously noted, the first and second dispensing periods may be consecutive (e.g., the second dispensing period may immediately succeed the first dispensing period) or the first and second dispensing period may be non-consecutive (e.g., one or more other dispensing periods may occur between the first and second dispensing periods). In certain example embodiments, the first value of the dispensing parameter for the first dispensing period may be adjusted to obtain a second value of the dispensing parameter for the second dispensing period. If the first dispensing period is in fact the initial dispensing period associated with operation of the dispenser, the first value of the dispensing parameter may be increased or decreased based on a default setting in order to obtain the second value of the dispensing parameter for the second dispensing period. For example, in certain example embodiments, the initial value of the dispensing parameter may be decreased to obtain the second value of the dispensing parameter based on a default assumption that a reduction in the amount of product dispensed per dispensing cycle may result in a reduced overall usage per user for a dispensing period. For example, if an initial sheet length of 10 inches is dispensed for each dispensing cycle during the first dispensing period, the sheet length may be reduced to 9 inches for the subsequent second dispensing period.

As will be described in more detail hereinafter, the value of the dispensing parameter for a third dispensing period that occurs at some point after the second dispensing period may then be determined based on an evaluation of the relationship between the first value of the dispensing parameter during the first dispensing period and the second value of the dispensing parameter during the second dispensing period and the relationship between the aggregate usage per user during the first dispensing period and the aggregate usage per user during the second dispensing period. An adjustment to the dispensing parameter value for any given dispensing period subsequent to the third dispensing period may be similarly determined based on a relationship between the respective dispensing parameter values for any two prior dispensing periods and a relationship between the respective aggregate usages per user for the two prior dispensing periods.

As previously noted, in the case in which the first dispensing period is the initial dispensing period, the first value of the dispensing parameter may be adjusted (e.g., decreased) based on a default setting to obtain the second value of the dispensing parameter for the second dispensing period. If, on the other hand, the first dispensing period is some dispensing period subsequent to the initial dispensing period, the first value of the dispensing parameter may be increased or decreased to obtain the second value of the dispensing parameter for the second dispensing period based on a comparison of usage data associated with the first dispensing period and usage data associated with a previous (e.g., an immediately preceding) dispensing period, as will be described in more detail below.

In a similar manner as described above with respect to the first dispensing period, a first counter of the accumulated value of the dispensing parameter (e.g., the aggregate amount of product dispensed) during the second dispensing period may be maintained. For example, the first counter may represent the total amount of sheet product dispensed during the second dispensing period. In addition, a second counter of an estimated number of unique users that received dispenses during the second dispensing period may also be maintained. At any point after the conclusion of the second dispensing period, the second value of the dispensing parameter during the second dispensing period may be compared to the first value of the dispensing parameter during the first dispensing period. In addition, the aggregate amount of product dispensed per user (also referred to herein as accumulated value of the dispensing parameter, accumulated usage per user, aggregate usage per user, or usage data per user) during the first dispensing period may be compared to the aggregate amount of product dispensed per user during the second dispensing period. The nature of the adjustment made (if any) to a previous value of the dispensing parameter to obtain a third value of the dispensing parameter for a third dispensing period may be determined based on these comparisons.

While example embodiments of the disclosure discussed herein may describe an adjustment to the second value of the dispensing parameter during the second dispensing period to obtain the third value of the dispensing parameter for use during a third dispensing period, it should be appreciated that the results of comparing usage data for the first and second dispensing periods may be used to adjust any previous dispensing parameter value associated with any previous dispensing period in order to obtain the third value of the dispensing parameter for the third dispensing period. Further, as previously noted, the first and second dispensing periods may not be consecutive and/or may not immediately precede the third dispensing period, but rather may represent any two historical dispensing periods. As such, the first and second dispensing parameter values and the corresponding accumulated usage values may represent stored historical values corresponding to any prior dispensing periods.

In certain example embodiments, the first and second dispensing periods may be chosen based on user consumption patterns. For example, the first and second dispensing periods may represent non-consecutive dispensing periods that occur during approximately the same time of day on different days. As an example, user traffic patterns for an airport restroom may be starkly different Monday morning at 8 AM as compared to Wednesday evening at 8 PM. In such an example, first and second dispensing periods that occur Monday mornings on different weeks may be the most appropriate dispensing periods to select for comparison of usage data to obtain a third dispensing parameter value for a third dispensing period occurring Monday morning of some subsequent week. In other example embodiments, the first and second values of the dispensing parameter and the corresponding accumulated values may not correspond to particular first and second dispensing periods, but may instead represent average values for any number of prior dispensing periods, mode values across any number of prior dispensing periods, median values across any number of dispensing periods, or the like. In certain example embodiments, dispensing data for other product dispensers (e.g., dispensing parameter values, accumulated values, etc.) may be used to optimize a dispensing parameter value for a product dispenser.

In yet further example embodiments, different datasets of dispensing data may be maintained and independently optimized based, for example, on different user consumption patterns. For example, a first product dispenser may be located in a high-traffic area that experiences steady user traffic throughout the day, whereas a second product dispenser may be located in an area that experiences relatively low user traffic throughout the day except for limited spikes in user activity (e.g., in the morning, during lunchtime, etc.). For the second product dispenser, a first dataset may be maintained for dispensing periods that coincide with the spikes in user activity and a second dataset may be maintained for dispensing periods that coincide with the low levels of user activity, where the first dataset includes dispensing parameter values that are optimized independently of dispensing parameter values included in the second dataset.

Other example scenarios in which separate datasets of dispensing parameter values may be maintained and independently optimized may involve differences in characteristics of users during different dispensing periods. For example, users of a product dispenser located in a primary school may be more likely to be adults (e.g., visitors, staff, etc.) during class hours, whereas users between class hours may be more likely to be children. Adults and children may exhibit different use characteristics. For example, children may generally consume less product due to the smaller size of their hands. As another example, adults may have more of an incentive to minimize product consumption based on a desire to conserve and prevent waste. As such, an optimization process described herein may optimize a dispensing parameter value for a dispensing period during class hours based on a first dataset of dispensing parameter values for dispensing periods that coincide with class hour time periods and may optimize the dispensing parameter value for a dispensing period between class hours based on a second dataset of dispensing parameter values for dispensing periods that coincide with time periods between class hours. It should be appreciated that the above examples are merely illustrative and not exhaustive.

Referring again to example embodiments in which the second dispensing parameter value is adjusted to obtain the third dispensing parameter value, if the second dispensing parameter value is less than the first dispensing parameter value and the aggregate usage per user for the second dispensing period is less than the aggregate usage per user for the first dispensing period, the second dispensing parameter value may be decreased to obtain the third dispensing parameter value. The decrease in the second dispensing parameter value to obtain the third dispensing parameter value may be based on: i) the fact that a decrease in the dispensing parameter value from the first dispensing period to the second dispensing period resulted in a decreased overall usage per user for the second dispensing period as compared to the first dispensing period and ii) an assumption that a further decrease in the dispensing parameter value may result in a further decrease in the overall usage per user for the third dispensing period.

On the other hand, if the second dispensing parameter value is less than the first dispensing parameter value and the aggregate usage per user for the second dispensing period is greater than the aggregate usage per user for the first dispensing period, the second dispensing parameter value may be increased to obtain the third dispensing parameter value. The increase in the second dispensing parameter value to obtain the third dispensing parameter value may be based on: i) the fact that a decrease in the dispensing parameter value from the first dispensing period to the second dispensing period resulted in an increased overall usage per user for the second dispensing period as compared to the first dispensing period and ii) an assumption that an increase in the second dispensing parameter value may result in a decrease in the overall usage per user for the third dispensing period as compared to the second dispensing period. In this scenario, the dispensing parameter may be increased to a third value that is greater than the second dispensing parameter value but less than the first dispensing parameter value based on an assumption that an intermediate value between the first dispensing parameter value and the second dispensing parameter value may result in reduced overall usage per user for the third dispensing period as compared to the first dispensing period. For example, to obtain the third dispensing parameter value, the second dispensing parameter value may be increased to a value that is more than half way between the second dispensing parameter value and the first dispensing parameter value. In certain example embodiments, however, the second dispensing parameter value may be increased to a value that is equal to or greater than the first dispensing parameter value in order to obtain the third dispensing parameter value. This may occur, for example, if the first dispensing period is the initial dispensing period or a relatively early dispensing period in the optimization process. This may also occur if the incremental amount by which the dispensing parameter value is adjusted is small enough to not, in and of itself, cause a significant disturbance to user behavior.

In other scenarios, the second dispensing parameter value may be greater than the first dispensing parameter value. In such scenarios, if the aggregate usage per user during the second dispensing period increased as compared to the aggregate usage per user during the first dispensing period, the second dispensing parameter value may be decreased to obtain the third dispensing parameter value. The decrease in the second dispensing parameter value to obtain the third dispensing parameter value may be based on: i) the fact that an increase in the dispensing parameter value from the first dispensing period to the second dispensing period resulted in an increased overall usage per user for the second dispensing period as compared to the first dispensing period and ii) an assumption that a decrease in the dispensing parameter value may result in a decrease in the overall usage per user for the third dispensing period as compared to the second dispensing period. In this scenario, the dispensing parameter may be decreased to a third value that is less than the second dispensing parameter value but greater than the first dispensing parameter value based on an assumption that an intermediate value between the first dispensing parameter value and the second dispensing parameter value may result in reduced overall usage per user for the third dispensing period as compared to the first dispensing period. In certain example embodiments, however, the third dispensing parameter value may be equal to or less than the first dispensing parameter value. This may occur if, for example, the first dispensing period is the initial dispensing period or a relatively early dispensing period in the optimization process. This may also occur, as similarly noted above, if the incremental amount by which the dispensing parameter value is adjusted is small enough to not, in and of itself, cause a significant disturbance to user behavior.

If, on the other hand, the second dispensing parameter value is greater than the first dispensing parameter value and the aggregate usage per user during the second dispensing period decreased as compared to the aggregate usage per user during the first dispensing period, the second dispensing parameter value may be increased to obtain the third dispensing parameter value. The increase in the second dispensing parameter value to obtain the third dispensing parameter value may be based on: i) the fact that an increase in the dispensing parameter value from the first dispensing period to the second dispensing period resulted in a decreased overall usage per user for the second dispensing period as compared to the first dispensing period and ii) an assumption that a further increase in the dispensing parameter value may result in a further decrease in the overall usage per user for the third dispensing period as compared to the first dispensing period.

The various relationships that may exist between the first dispensing parameter value and the second dispensing parameter value and the various relationships that may exist between the aggregate usage per user for the first dispensing period and the aggregate usage per user for the second dispensing period as well as the corresponding adjustments that may be made to the second dispensing parameter value to obtain the third dispensing parameter value are shown in the table on the following page.

| Second dispensing parameter value > first dispensing parameter value | Aggregate usage per user for second dispensing period > aggregate usage per user for first dispensing period | Adjustment made to second dispensing parameter value to obtain third dispensing parameter value |
| --- | --- | --- |
| No | No | Decrease |
| No | Yes | Increase |
| Yes | No | Increase |
| Yes | Yes | Decrease |

After determining the appropriate adjustment to be made to the second dispensing parameter value to obtain the third dispensing parameter value, dispensing cycles that occur during the third dispensing period may utilize the third dispensing parameter value. Upon completion of the third dispensing period, a similar process to that described above may be performed to determine the nature of the adjustment to be made to the third dispensing parameter value (or some other dispensing parameter value associated with some other previous dispensing period) to obtain a fourth dispensing value for a fourth dispensing period that succeeds the third dispensing period. The process may then be repeated iteratively in perpetuity, or alternatively for any number of dispensing periods until an optimized value or optimized range of values for the dispensing parameter is reached. In certain example embodiments, the optimization process may be repeated until a difference in aggregate usage per user between successive dispensing periods is within a predetermined threshold. In other example embodiments, the dispensing parameter value may be iteratively adjusted until no change in the aggregate usage per user is observed for some threshold number of iterations. In other example embodiments, the dispensing parameter value may be iteratively adjusted as long as the dispenser is operational.

The amount by which the value of the dispensing parameter for a current dispensing period may be adjusted to obtain a value of the dispensing parameter for a successive dispensing period may depend on the number of iterations of the optimization process that have been performed. For example, during early iterations in the optimization process, the dispensing parameter value may be adjusted in larger increments from one dispensing period to the next dispensing period as compared to later iterations in the optimization process. Referring, solely for explanatory purposes, to an example embodiment in which the dispensing parameter is dispense duration, if we assume that the initial value of the dispensing parameter for the first dispensing period is 5 seconds (where the first dispensing period represents the initial dispensing period at a starting point of the optimization process) and the dispense duration is decremented to 4 seconds for the second dispensing period based, for example, on a default setting, and we further assume that the aggregate usage per user during the second dispensing period is less than the aggregate usage per user during the first dispensing period, then the second dispensing parameter value may be further decremented by 1 second to obtain a third dispensing parameter value of 3 seconds for a third dispensing period. If the aggregate usage per user decreases for the third dispensing period as well, and as long as the aggregate usage per user continues to decrease for subsequent dispensing periods, the dispensing parameter value may be adjusted by the same incremental amount. When, however, the aggregate usage per user actually increases during a particular dispensing period as compared to a previous (e.g., immediately preceding) dispensing period, the value of the dispensing parameter for the particular dispensing period may be increased by a smaller amount (e.g., less than 1 second) to obtain the dispensing parameter value for the next dispensing period. The optimization process may continue in this manner such that each time the aggregate usage per user increases for a given dispensing period as compared to a previous dispensing period the dispensing parameter value is adjusted by a smaller increment for a subsequent dispensing period. In this manner, an optimized dispensing parameter value or an optimized range of dispensing parameter values may be obtained.

In one or more alternative example embodiments, the amount by which the value of the dispensing parameter is adjusted from one dispensing period to the next may be constant. This would allow meaningful adjustments to be made to the dispensing parameter value even after numerous dispensing periods, in the event that a significant change to user behavior or other dispensing conditions occurs. For example, after the optimization process has achieved an optimized value for a dispensing parameter, a different type of sheet product roll having different absorbency properties than previous rolls may be installed in a product dispenser. Due to its different absorbency properties, a different optimized value of the dispensing parameter may be associated with the different type of sheet product roll. Accordingly, in such example scenarios, more substantial adjustments to the value of the dispensing parameter (e.g., incrementing or decrementing by a constant value) may need to be made as part of the optimization process even if the dispensing parameter value had been previously optimized under different conditions. An additional example relating to decreasing battery voltage over time is described later in this disclosure.

It should be appreciated that, in certain example embodiments, certain dispensing parameters may be susceptible to more granular adjustment than other dispensing parameters. For example, it may be possible to adjust (e.g., increase or decrease) a dispense duration by X milliseconds. However, a sheet length, for example, may be adjustable in less granular increments/decrements such as 1 inch depending upon hardware, software, firmware, and/or other specifications or configurations of a product dispenser. Further, in certain example embodiments, a particular dispensing parameter may serve to accomplish the same result as another dispensing parameter. For example, using dispense duration as a dispensing parameter and optimizing a dispense duration may serve to optimize a sheet length dispensing parameter because the objective of optimizing either dispensing parameter may be to reduce aggregate usage per user. If dispensing duration is used as a dispensing parameter, changes in voltage from a power source (e.g., a decrease in battery voltage) may cause a lesser amount of product to be dispensed over time for a given dispensing duration. However, if the reduction in the amount of product dispensed were to cause the aggregate usage per user to increase, iterations of the optimization process would result in an adjustment to the dispensing parameter that increases the dispense duration in order to once again arrive at an optimum value or range of values for the dispensing duration.

In certain example embodiments, any number of different dispensing parameters that serve as proxies for a product amount may be optimized. Such dispensing parameters that may operate as proxies for a product amount include, but are not limited to, product sheet length, product volume, dispense duration, soap concentration, product weight, product area, wet wipe moisture concentration, or the like. For certain dispensing parameter proxies (e.g., product sheet length), the correlation between the dispensing parameter proxy and product amount may remain relatively constant through the life-cycle of the product dispenser, while for other dispensing parameter proxies (e.g., dispense duration), the correlation may change over time. However, as described above with respect to dispense duration, optimization processes described herein may be used to optimize the dispensing parameter proxy (and thus product amount) despite changes in the correlation between the dispensing parameter proxy and product amount.

In certain example embodiments, an adjustment in the first dispensing parameter value to obtain the second dispensing parameter value may result in no change in the aggregate usage per user. In such example embodiments, the second dispensing parameter value may nonetheless be increased or decreased to obtain a third dispensing parameter value for a third dispensing period subsequent to the second dispensing period. For example, in those example embodiments, in which the aggregate usage per user is unchanged from the first dispensing period to the second dispensing period, the direction in which the second dispensing parameter value is adjusted (e.g., whether the second dispensing parameter value is increased or decreased to obtain the third dispensing parameter value) may be the same as a direction in which the first dispensing parameter value was adjusted to obtain the second dispensing parameter value. For example, if the first dispensing parameter value was increased to obtain the second dispensing parameter value, then the second dispensing parameter value may be increased to obtain the third dispensing parameter value despite the lack of change in aggregate usage per user from the first dispensing period to the second dispensing period. Based on similar algorithmic logic, if the first dispensing parameter value was decreased to obtain the second dispensing parameter value, then the second dispensing parameter value may be decreased to obtain the third dispensing parameter value despite the lack of change in aggregate usage per user from the first dispensing period to the second dispensing period.

More specifically, assuming that the first dispensing period is not the initial dispensing period, the first dispensing parameter value may have been increased to obtain the second dispensing parameter value in either of two scenarios: 1) a scenario in which a prior dispensing value for a dispensing period prior to the first dispensing period was decreased to obtain the first dispensing parameter value and this resulted in an increase in aggregate usage per user for the first dispensing period or 2) a scenario in which the prior dispensing value for the prior dispensing period was increased to obtain the first dispensing parameter value and this resulted in a decrease in the aggregate usage per user for the first dispensing period. Similarly, the first dispensing parameter value may have been decreased to obtain the second dispensing parameter value in either of two scenarios: 1) a scenario in which the prior dispensing value was increased to obtain the first dispensing parameter value and this resulted in an increase in aggregate usage per user for the first dispensing period or 2) a scenario in which the prior dispensing value for the prior dispensing period was decreased to obtain the first dispensing parameter value and this resulted in a decrease in the aggregate usage per user for the first dispensing period. In any of these scenarios, if the increase or decrease in the first dispensing parameter value to obtain the second dispensing parameter value results in no change in the aggregate usage per user, then the second dispensing parameter value may be adjusted to obtain the third dispensing parameter value in the same direction as the adjustment to the first dispensing parameter value to obtain the second dispensing parameter value.

The example dispensing parameter of dispense duration will now be used to explain the algorithmic logic described above. Assume that the prior dispensing parameter value is 3 seconds and that this value was decreased to 2 seconds to obtain the first dispensing parameter value. If this resulted in an increase in aggregate usage per user, it may indicate that the increase in the amount of product used as a result of one or more users requesting multiple dispenses at the 2 second dispense duration who would not have requested multiple dispenses at the 3 second dispense duration exceeds the reduction in the amount of product used by other users as a result of the decrease in the dispense duration from 3 seconds to 2 seconds. As such, the first dispensing parameter value of 2 seconds may be increased to, for example, 2.5 seconds for the second dispensing parameter value. If this increase results in no change in the aggregate usage per user, it may be assumed that a further increase in the dispense duration may cause a decrease in aggregate usage per user, since aggregate usage per user was less with a 3 second dispense duration than with either a 2 second dispense duration or a 2.5 second dispense duration. As such, the second dispensing parameter value of 2.5 seconds may be increased to obtain the third dispensing parameter value. Thus, the direction of the adjustment of the second dispensing parameter value to obtain the third dispensing parameter value may be the same as the direction of the adjustment of the prior dispensing parameter value to obtain the first dispensing parameter value despite a lack of change in aggregate usage per user between the first dispensing period and the second dispensing period. Similar algorithmic logic may be applied to the other scenarios described above.

While example embodiments of the disclosure may be described herein in connection with storing an accumulated/aggregate dispensing parameter value for a dispensing period in a first counter, storing a number of unique users during the dispensing period in a second counter, and determining a usage rate for the dispensing period as a ratio the first counter to the second counter, it should be appreciated that the usage rate for a dispensing period may be determined in a variety of alternative ways without departing from the scope of the disclosure. For example, in certain example embodiments, a "running average" or the like of the usage rate may be maintained throughout the dispensing period without explicitly maintaining the accumulated/aggregate value of a dispensing parameter in a first counter and/or the number of unique users in a second counter. The running average may be updated as each dispensing cycle of the dispensing period occurs. In addition, while in certain example embodiments, a set value of the dispensing parameter may be used to adjust the accumulated value (or the running average) with each dispensing cycle, in other example embodiments, a measured value of the dispensing parameter may be used. It should further be appreciated that the terms accumulated and aggregate may be used interchangeably herein.

Referring now to other aspects of example optimization processes described herein, a counter of the estimated number of unique users may be maintained for each dispensing period, as previously described. For example, a predetermined period of time may be used to distinguish dispenses received by a same user from dispenses received by different users. More specifically, two dispenses that occur more than a threshold period of time apart from one another may be assumed to have been dispensed to different users, while a dispense that occurred within the threshold period of time from another dispense may be assumed to have been dispensed to the same user.

Occurrence of a dispense may refer to a time at which a dispense signal was generated, a time at which an actuation signal for actuating a dispensing mechanism is generated by a controller or received by the dispensing mechanism, a time at which a dispensing cycle is initiated, a time at which a dispensing cycle is completed, or any time during a dispensing cycle. More specifically, the threshold period of time between dispenses may be determined in a variety of ways. For example, the threshold period of time may be a time period between i) generation of a first actuation signal by the controller or receipt of the first actuation signal by the dispensing mechanism and ii) generation of a second subsequent actuation signal by the controller or receipt of the second actuation signal by the dispensing mechanism. Alternatively, the threshold period of time for distinguishing dispenses that occur to a same user or different users may be a time period between receipt of a first signal from a user sensor or a tear sensor and receipt of a second subsequent signal from the user sensor or tear sensor. In still other example embodiments, the threshold period of time may be a time period between completion of a first dispensing cycle (e.g., completion of a first motor run) and receipt or generation of a user sensor signal, tear sensor signal, or actuation signal (or initiation of a second motor run) corresponding to a second subsequent dispensing cycle. Thus, the threshold period of time may be measured between the occurrence/detection of like events (e.g., successive activations of a tear sensor of a product dispenser) or disparate events (e.g., a first activation of a tear sensor and generation of an actuation signal in connection with a subsequent activation of the tear sensor). Further, while a period of time of 10 seconds may be described herein as the predetermined period of time solely for ease of explanation, this should not be deemed limiting in any way. Rather, the predetermined period of time used to determine whether multiple dispenses should be attributed to the same user or different users may be any suitable period of time (e.g., 6 seconds, 8 seconds, 12 seconds, etc.). In particular, as will be described in more detail later in this disclosure, the predetermined period of time may be chosen to be a time period that corresponds to a minimum desired confidence factor. For example, a shorter predetermined period of time may be chosen as the number of estimated users per hour increases. Alternatively, as will be described in more detail later in this disclosure, the predetermined period of time may be constant, and the confidence factor may be updated as traffic patterns and usage change.

In certain example embodiments of the disclosure, estimating a number of unique users based solely on whether dispenses occurred within or outside of a predetermined period of time may result in inaccurate estimates. For example, the possibility exists that two users may each request a product within the 10 seconds of each other. This possibility becomes increasing more likely as user traffic increases and more individuals approach a product dispenser within 10 seconds of each user. Thus, as user traffic increases, the capability to distinguish a number of unique users diminishes, resulting in increasingly inaccurate aggregate usage per user calculations. This in turn compromises the ability to arrive at an optimized value for a dispensing parameter.

In order to counteract the effects of increased user traffic noted above, the estimate of the number of users may be statistically refined for any given dispensing period. A confidence factor may be determined for a given set of usage data. In certain example embodiments, the usage data may be simulated usage data. As previously mentioned, the confidence factor may represent an approximate probability that two dispenses that occurred within the threshold period of time were to the same user. The confidence factor may be determined using any suitable statistical approach. An example statistical approach will be described in more detail in reference to FIGS. 5A-5B later in this disclosure. In certain example embodiments, the confidence factor may be determined as a function of an estimated number of unique users over some period of time (e.g., an hour).

It should be appreciated that, in certain example embodiments, the amount of time required to complete a dispensing cycle may represent a floor for the threshold period of time used to distinguish dispenses occurring to the same user from dispenses occurring to different users. For example, in the case of a "hang-mode" product dispenser, upon activation of the tear sensor, a certain period of time (e.g., 4-6 seconds) may be required for the tear sensor to signal the controller, the controller to generate an actuation signal to actuate the dispensing mechanism, and the dispensing mechanism to dispense an amount of product. Accordingly, any threshold period of time used to distinguish dispenses occurring to the same user or different users may need to account for this minimum period of time required to complete a dispensing cycle in order to yield a suitable estimate for the number of unique users that receive dispenses. The threshold period of time may be chosen to account for other factors as well such as, for example, variance in user behavior, user traffic patterns, and so forth. For example, users may vary in the amount of time taken between triggering multiple dispenses, user traffic may affect the amount of time needed for a user to leave the vicinity of the dispenser and another user to approach the vicinity of the dispenser, and so forth.

In certain example embodiments, an initial estimate of the number of unique users over a period of time (e.g., over the course of a dispensing period) may be determined. More specifically, a first number of dispenses, each of which did not occur within, for example, 10 seconds of any other dispense, may be determined. The first number of dispenses may equal a first estimated number of unique users. A second number of dispenses may then be determined. Each dispense in the second number of dispenses may have occurred within, for example, 10 seconds of at least one other dispense in the second number of dispenses. The second number of dispenses may then be divided by two to obtain a second estimated number of unique users (based on the assumption that each pair of dispenses that occurred within 10 seconds of one another were received by the same user). The first estimated number of unique users and the second estimated number of unique users may then be summed to obtain a first total estimated number of unique users.

A confidence factor may then be determined for the first total estimated number of unique users. Using the confidence factor, a first statistical number of unique users, each of whom is statistically assumed to have received two dispenses within 10 seconds of each other, may be determined. The first statistical number of unique users may be determined by multiplying the second number of dispenses by the confidence factor and dividing the result by two. A second statistical number of unique users, each of whom is statistically determined to have received a dispense more than 10 seconds apart from any other dispense, may then be determined. The second statistical number of unique users may be determined by subtracting the first statistical number of unique users from the second estimated number of unique users. The first estimated number of unique users, the first statistical number of unique users, and the second statistical number of unique users may then be summed to obtain a second total estimated number of unique users.

The second total estimated number of unique users may then be compared to the first total estimated number of unique users. If the difference between the first total and the second total is non-zero, the process described above may be repeated. More specifically, a new confidence factor may be determined based on the second total estimated number of unique users, and the process described above may be repeated using the second confidence factor to obtain a third total estimated number of unique users. The process may be iteratively performed to refine the estimate of the number of actual unique users until the statistical estimate is unchanged from one iteration to the next or within some threshold difference. In general, the lower the amount of user traffic (e.g., number of users per hour), the fewer number of iterations that may be required to obtain a statistically improved estimate of the number of unique users. A more accurate estimate of the number of unique users may, in turn, improve the accuracy of the aggregate usage per user calculations for dispensing periods, and thus, the accuracy of the optimized dispensing parameter value or the optimized range of dispensing parameter values.

In one or more other example embodiments of the disclosure, a capability of a user sensor to distinguish between genuine and false triggering events may be optimized. A user sensor may detect a triggering event and generate a dispense signal. In response to receipt of the dispense signal, a controller may determine one or more characteristics of the dispense signal. A characteristic of a dispense signal may include, without limitation, an amplitude of the dispense signal, a frequency of the dispense signal, a waveform of the dispense signal, or the like. The controller may then access a sensor profile associated with the user sensor to determine, based at least in part on the sensor profile, whether the characteristic(s) of the dispense signal are within a specified tolerance of signal characteristic(s) identified in the sensor profile. In certain example embodiments, this may include determining that the sensor profile includes or is otherwise associated with a second signal characteristic that matches a first signal characteristic of the dispense signal within a specified tolerance, determining a probability that the second signal characteristic is indicative of a genuine user-initiated triggering event, and further determining that the probability meets or exceeds a threshold probability value. For example, if the first signal characteristic of the dispense signal is an amplitude of the dispense signal, the second signal characteristic may be an amplitude of a previously received dispense signal. If the two amplitudes are within a threshold value of one another, and if a probability that the amplitude of the previously received dispense signal is indicative of a genuine user-initiated triggering event meets or exceeds a threshold probability value (e.g., greater than or equal to 75%), it may be determined that a dispensing cycle should be initiated in response to the current dispense signal. On the other hand, if the first signal characteristic of the current dispense signal matches a second signal characteristic associated with the sensor profile within a specified tolerance, and if a probability that the second signal characteristic is indicative of genuine user-initiated triggering event is below the specified threshold probability value, that dispensing cycle may not be initiated in response to the current dispense signal because it may be determined that the current dispense signal is unlikely to be indicative of a genuine user-initiated triggering event, and a dispensing cycle may not be initiated. It should be appreciated that a probability that a dispense signal is indicative of a false trigger may be evaluated with respect to a corresponding threshold probability value in addition to or in lieu of a probability that the dispense signal is indicative of a genuine user trigger.

If, based on an evaluation of the current dispense signal with respect to the sensor profile, it is determined that the probability that the current dispense signal is indicative of a genuine user-triggering event meets or exceeds a specified threshold probability value, the controller may generate an actuation signal to cause a dispensing mechanism of the product dispenser to dispense an amount of product. A time that elapses between receipt of the dispense signal (or generation of the actuation signal or completion of the dispensing cycle) and receipt of an indication that the product has been used or retrieved may then be determined. For example, if the product dispenser dispenses towel, retrieval of the dispensed product may be determined based on activation of a tear sensor. As another example, if the product dispenser dispenses solids, liquids, gases, or a mixed-phase product such as an aerosol, foam, gel, or the like, for example a soap product, use/retrieval of the dispensed product may be determined based upon deactivation of a sensor, such as a user request sensor, that detects a user's hand that would receive soap in a particular location relative to the dispenser.

If the elapsed time is within a predetermined threshold range of time, the controller may determine that the dispense signal was indicative of a genuine user-initiated triggering event, in which case, the sensor profile may be modified to indicate an increased likelihood (e.g., an increased probability) that characteristic(s) of the dispense signal are indicative of a genuine trigger. If, on the other hand, the elapsed time is not within the predetermined threshold range of time, that is, that an indication of use/retrieval of the dispensed product was not received within the threshold range of time from a time corresponding to receipt of the dispense signal, generation of the actuation signal, initiation of the dispensing cycle, or completion of the dispensing cycle, then the sensor profile may be modified to indicate a decreased likelihood (e.g., a decreased probability) that the characteristic(s) of the dispense signal are indicative of a genuine user trigger, and therefore, an increased likelihood (e.g., an increased probability) that the characteristics(s) of the dispense signal are indicative of a false trigger. In an example embodiment involving a towel dispenser, if an elapsed time between receipt of the dispense signal and receipt of a tear sensor activation signal is within a predetermined threshold range of time (e.g., 0 to 4 seconds), this may constitute evidence of typical user behavior and may indicate that the dispense signal was characteristic of a genuine user request for product. As such, the sensor profile may be modified to indicate an increased likelihood that characteristic(s) of the dispense signal are indicative of a genuine trigger. If, on the other hand, an elapsed time between receipt of the dispense signal and receipt of a tear sensor activation signal is not within a predetermined threshold range of time (e.g., 0 to 4 seconds), this may constitute evidence contrary to genuine user behavior and may indicate that the dispense signal was not characteristic of a genuine user request for product. As such, the sensor profile may be modified to indicate a decreased likelihood that characteristic(s) of the dispense signal are indicative of a genuine trigger.

Along similar lines, in an example embodiment involving a soap dispenser, if an elapsed time of continuous receipt of the dispense signal, which may constitute evidence of the presence of a user's hand, is within a predetermined threshold range of time (e.g., 1 to 2 seconds), this may constitute evidence of typical user behavior and may indicate that the dispense signal was characteristic of a genuine user request for product. As such, the sensor profile may be modified to indicate an increased likelihood that characteristic(s) of the dispense signal are indicative of a genuine trigger. If, on the other hand, an elapsed time of continuous receipt of the dispense signal is not within a predetermined threshold range of time (e.g., 1 to 2 seconds), this may constitute evidence that the dispense signal was not characteristic of a genuine user request for product. As such, the sensor profile may be modified to indicate a decreased likelihood that characteristic(s) of the dispense signal are indicative of a genuine trigger. The above process may continue iteratively such that the sensor profile is refined over time to more accurately distinguish dispense signals indicative of genuine user triggers from dispense signals indicative of false triggers.

Example embodiments of the disclosure provide a number of technical features or technical effects. For example, in accordance with example embodiments of the disclosure, a dispensing parameter value may be optimized to achieve a desired performance outcome (e.g., minimized product usage, maximized user sensor reliability, etc.) in an automated fashion that accounts for fluctuations in user traffic, user behavior, or the like and that does not require manual user adjustment of the dispensing parameter. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Device Architecture

FIG. 1 is a diagram depicting a schematic representation of an illustrative product dispenser 102 and an illustrative networked architecture 100 that includes the product dispenser 102 in accordance with one or more example embodiments of the disclosure. The product dispenser 102 may be any suitable product dispenser including, but not limited to, automated product dispensers that dispense product in response to activation of a user sensor, tear sensor, or the like. While example embodiments may be described in connection with automated product dispensers, it should be appreciated that such example embodiments may be applicable to mechanically/manually operated product dispensers, air blowers, or the like.

In an illustrative configuration, the product dispenser 102 may include one or more controllers 112, one or more memory devices 114 (generically referred to herein as memory 114), one or more input/output ("I/O") interface(s) 116, one or more network interfaces 118, one or more sensors or sensor interfaces 120, one or more transceivers 122, and data storage 126. The product dispenser 102 may further include one or more buses 124 that functionally couple various components of the product dispenser 102. The product dispenser 102 may further include one or more antennas 140 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 124 may include at least one of a system bus, a memory bus, an address bus, or a message bus, and may permit exchange of information (e.g., data (including computer-executable code), signaling, etc.) between various components of the product dispenser 102. The bus(es) 124 may include, without limitation, a memory bus or a memory controller, a peripheral bus, an accelerated graphics port, and so forth. The bus(es) 124 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 114 of the product dispenser 102 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 114 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 114 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 126 may include removable storage and/or non-removable storage including, but not limited to, magnetic storage, optical disk storage, and/or tape storage. The data storage 126 may provide non-volatile storage of computer-executable instructions and other data. The memory 114 and the data storage 126, removable and/or non-removable, are examples of computer-readable storage media (CRSM) as that term is used herein.

The data storage 126 may store computer-executable code, instructions, or the like that may be loadable into the memory 114 and executable by the controller(s) 112 to cause the controller(s) 112 to perform or initiate various operations. The data storage 126 may additionally store data that may be copied to memory 114 for use by the controller(s) 112 during the execution of the computer-executable instructions. Moreover, output data generated as a result of execution of the computer-executable instructions by the controller(s) 112 may be stored initially in memory 114, and may ultimately be copied to data storage 126 for non-volatile storage.

More specifically, the data storage 126 may store one or more program modules, applications, or the like such as, for example, one or more dispensing parameter optimization modules 128 which, in turn, may include one or more sub-modules such as, for example, one or more dispensing parameter value adjustment modules 130 and one or more unique user determination modules 132. The data storage 126 may further store one or more dispensing control modules 134. The data storage 126 may additionally store any of a variety of other types of modules such as, for example, one or more application modules associated with one or more applications executable on the product dispenser 102. It should be appreciated that, in various example embodiments, the data storage 126 may not be provided, and any program modules or other data depicted or described as being potentially stored in the data storage 126 may be stored in the memory 114 (e.g., non-volatile memory) instead.

Referring now to functionality supported by the various program modules depicted in FIG. 1, the dispensing control module(s) 134 may include computer-executable instructions, code, or the like that responsive to execution by one or more of the controller(s) 112 may cause an actuation signal to be generated in response to a dispense signal received from a user sensor 120, a tear sensor 120, or the like. The actuation signal may cause a dispensing mechanism 136 of the product dispenser 102 to dispense a predetermined amount of product as part of a dispensing cycle during a dispensing period. A dispensing period may include any number of dispensing cycles during which predetermined amounts of products are dispensed to users 104.

More specifically, in certain example embodiments, the actuation signal may cause a voltage to be supplied from a power source (e.g., a battery) (not shown) to actuate a motor of the dispensing mechanism 136 to cause a predetermined amount of product from a product supply 138 to be dispensed. The actuation signal may cause a voltage to be supplied to the motor of the dispensing mechanism 136 for a sufficient duration to cause the motor to actuate one or more other components of the dispensing mechanism 136 (e.g., one or more rollers, a pump, a fan, etc.) to dispense a predetermined amount of product in accordance with a current value of a dispensing parameter. As previously noted, the dispensing parameter may include any suitable parameter including, but not limited to, a dispense duration, a sheet length, a volume of product, or the like.

The dispensing parameter optimization module(s) 128 may include computer-executable instructions, code, or the like that responsive to execution by one or more of the controller(s) 112 may cause one or more iterations of a dispensing parameter value optimization process to be performed in accordance with example embodiments of the disclosure. As previously described and as will be described in more detail later in this disclosure, the dispensing parameter value optimization process may include maintaining, for any two dispensing periods, respective first counters representing an aggregate amount of product dispensed for each dispensing period and respective second counters representing a number of unique users that received dispenses for each dispensing period, and determining a relationship between the respective first counters and a relationship between the respective second counters in order to determine, in accordance with algorithmic logic, whether a current (or some previous) dispensing parameter value should be increased, decreased, or remain unchanged to obtain a dispensing parameter value for a subsequent dispensing period.

The dispensing parameter value adjustment module(s) 130 may include computer-executable instructions, code, or the like that responsive to execution by one or more of the controller(s) 112 may cause a current value (or some previous value) of a dispensing parameter for a current (or previous) dispensing period to be increased, decreased, or remain unmodified based on the results of a current iteration of the dispensing parameter value optimization process in order to obtain a subsequent dispensing parameter value for a subsequent dispensing period. The dispensing parameter optimization module(s) 128 may further include computer-executable instructions, code, or the like that responsive to execution by one or more of the controller(s) 112 may cause processing to be performed to optimize a capability of a user sensor 120 of the product dispenser 102 to distinguish between genuine and false triggers.

The unique user determination module(s) 132 may include computer-executable instructions, code, or the like that responsive to execution by one or more of the controller(s) 112 may cause processing to be performed to determine a number of unique users during a dispensing period using, for example, a threshold period of time between dispensing cycles to determine whether any two given dispenses are attributable to the same user or different users. The unique user determination module(s) 132 may further include computer-executable instructions, code, or the like that responsive to execution by one or more of the controller(s) 112 may cause processing to be performed to refine an estimate of the number of unique users for a dispensing period using a statistical process that employs a statistically determined confidence factor.

Referring now to other illustrative components of the product dispenser 102, the controller(s) 112 may be configured to access the memory 114 and execute computer-executable instructions loaded therein. For example, the controller(s) 112 may be configured to execute computer-executable instructions of the various program modules of the product dispenser 102 to cause or facilitate various operations to be performed in accordance with one or more embodiments of the disclosure. The controller(s) 112 may include any suitable processing unit capable of accepting data as input, processing the input data in accordance with stored computer-executable instructions, and generating output data. The controller(s) 112 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the controller(s) 112 may have any suitable microarchitecture design that includes any number of constituent components such as, for example, registers, multiplexers, arithmetic logic units, cache controllers for controlling read/write operations to cache memory, branch predictors, or the like. The microarchitecture design of the controller(s) 112 may be capable of supporting any of a variety of instruction sets.

In addition, the product dispenser 102 may include one or more input/output (I/O) interfaces 116 that may facilitate the receipt of input information by the product dispenser 102 from one or more I/O devices as well as the output of information from the product dispenser 102 to the one or more I/O devices. The I/O devices may include, for example, one or more user interface devices that facilitate interaction between a user and the product dispenser 102 including, but not limited to, a display, a keypad, a pointing device, a control panel, a touch screen display, a stylus, a remote control device, a microphone, a speaker, and so forth. The I/O devices may further include, for example, any number of peripheral devices such as data storage devices, printing devices, and so forth.

The product dispenser 102 may further include one or more network interfaces 118 via which the product dispenser 102 may communicate with any of a variety of other systems, platforms, networks, devices, and so forth. Such communication may occur via any of the types of networks previously described. The product dispenser 102 may be configured to communicate via one or more networks 110 with, for example, one or more back-end servers 106. The network(s) 110 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 110 may have any suitable communication range associated therewith and may include, for example, global networks (e.g., the Internet), metropolitan area networks (MANs), wide area networks (WANs), local area networks (LANs), or personal area networks (PANs). In addition, the network(s) 110 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In addition, the product dispenser 102 may include one or more antenna(s) 140 that may include any suitable type of antenna depending, for example, on the communications protocols used to transmit or receive signals via the antenna(s) 140. Non-limiting examples of suitable antennas may include directional antennas, non-directional antennas, dipole antennas, folded dipole antennas, patch antennas, multiple-input multiple-output (MIMO) antennas, or the like. The antenna(s) 140 may be communicatively coupled to one or more transceivers 122 or radio components to which or from which signals may be transmitted or received.

As previously described, the antenna(s) 140 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 140 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 232 may be configured to transmit or receive radio frequency signals within any suitable frequency range forming part of the unlicensed portion of the radio spectrum.

The antenna(s) 140 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 122 may include any suitable radio component(s) for—in cooperation with the antenna(s) 140—transmitting or receiving radio frequency (RF) signals in the bandwidth and/or channels corresponding to the communications protocols utilized by the product dispenser 102 to communicate with other devices. The transceiver(s) 122 may include hardware, software, and/or firmware for modulating, transmitting, or receiving—potentially in cooperation with any of antenna(s) 140—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 122 may further include hardware, firmware, or software for receiving GNSS signals. The transceiver(s) 122 may include any known receiver and baseband suitable for communicating via the communications protocols utilized by the product dispenser 102. The transceiver(s) 122 may further include a low noise amplifier (LNA), additional signal amplifiers, an analog-to-digital (A/D) converter, one or more buffers, a digital baseband, or the like.

The sensor(s)/sensor interface(s) 120 may include or may be capable of interfacing with any suitable type of sensing device such as, for example, a sheet length sensor, a tear sensor, a photo sensor, a radar-based sensor, a passive infrared sensor, an active infrared sensor, a capacitive sensor, or any other suitable type of sensor capable of being triggered, for example, by the presence, motion, or quantity of an object.

Further, although not depicted in FIG. 1, the product dispenser 102 may further include an operating system (O/S) that may be loaded from the data storage 126 into the memory 114 and that may provide an interface between other software modules executing on the product dispenser 102 and hardware resources of the product dispenser 102. More specifically, the O/S may include a set of computer-executable instructions for managing hardware resources of the product dispenser 102 and for providing common services to other program modules (e.g., managing memory allocation among various program modules).

In addition, the product dispenser 102 may include a database management system (DBMS) that may be loaded into the memory 114 from the data storage 126 and that may support functionality for accessing, retrieving, storing, and/or manipulating data stored in the memory 114 and/or data stored in the data storage 126. The DBMS may be, for example, a light-weight DBMS optimized for performance on the product dispenser 102. The DBMS may use any of a variety of database models (e.g., relational model, object model, etc.) and may support any of a variety of query languages. The DBMS may access data represented in one or more data schemas and stored in any suitable data repository including, but not limited to, one or more of the datastore(s) 108, which may include databases (e.g., relational, object-oriented, etc.), file systems, flat files, distributed datastores in which data is stored on more than one node of a computer network, peer-to-peer network datastores, or the like.

The back-end server(s) 106 may include any suitable computing device and may include any of the illustrative types of hardware, firmware, and/or software components described in relation to the product dispenser 102. The back-end server(s) 106 may be configured to receive usage data for the dispenser 102 (and any number of additional dispensers), analyze the usage data, and generate performance data indicative of performance metrics associated with operation of the dispenser 102. For example, the back-end server(s) 106 may generate performance data that indicates changes in the aggregate usage per user for the product dispenser 102 over some period of time. The performance data may be used to evaluate the optimization process and to determine whether one or more modifications to the process (e.g., modifying an incremental amount by which a dispensing parameter value is incremented or decremented from one dispensing period to the next) may be needed based on user behavior trends identified from the performance data. For example, if the usage data indicates increased user traffic for one or more dispensing periods, the duration of a dispensing period may be shortened. As another example, if the usage data indicates increased user traffic, the predetermined threshold time period used to distinguish dispenses occurring to a same user or to different users may be decreased in order to maintain a desired confidence factor. It should be appreciated that the above examples are merely illustrative and not exhaustive. It should further be appreciated that any of the processing that may be performed responsive to execution of any of the program modules of the product dispenser 102 may be performed, at least in part, by the back-end server(s) 106. For example, the back-end server(s) 106 and the product dispenser 102 may execute the dispensing parameter value optimization process in a distributed fashion. Further, the analysis and generation of performance data may be performed, at least in part, by executable logic stored on the product dispenser 102.

Various data that may be utilized or generated by the product dispenser 102 and/or the back-end server(s) 106 may be stored in the datastore(s) 108. The data may include, for example, counter values 142, dispensing parameter values 144, confidence factors 146, and any other suitable types of data 148. The counter values may include respective first counter values representing aggregate usage for each of any number of dispensing periods and/or respective second counter values representing an estimated number of unique users for each of any number of dispensing periods. The dispensing parameter values 144 may include a pre-programmed or manually set initial dispensing parameter value, respective calculated values for each of any number of dispensing periods, measured dispensing parameter values, and so forth. The confidence factors 146 may include different confidence factors calculated for different estimated numbers of unique users for any number of dispensing periods. The other data 148 may include any other suitable data such as dispense signal characteristics, a sensor profile of the product dispenser 102, and so forth. Any of the data depicted as being stored in the datastore(s) 108 may be generated by the product dispenser 102 and/or the back-end server(s) 106 and may be additionally, or alternatively, stored in the data storage 126 and/or the memory 114 of the product dispenser 102 and/or in suitable storage media of the back-end server(s) 106.

It should be appreciated that the back-end server(s) 106, the datastore(s) 108, and the network(s) 110 may be optional in certain example embodiments of the disclosure. In addition, in certain example embodiments, all of the algorithmic logic for performing optimization processes as described herein may reside locally on the product dispenser 102, thereby obviating the need for the product dispenser 102 to communicate over a network. Thus, in certain example embodiments, the network interface(s) 118, transceiver(s) 122, and antenna(s) 140 may not be present.

It should be appreciated that the program modules, applications, computer-executable instructions, code, data, or the like depicted in FIG. 1 as being stored in the data storage 126 and the datastore(s) 108 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the product dispenser 102, on the back-end server(s) 106, and/or hosted on other computing device(s) accessible via one or more of the network(s) 110, may be provided to support functionality provided by the program modules, applications, or computer-executable code depicted in FIG. 1 and/or additional or alternate functionality. Further, functionality may be modularized differently such that processing described as being supported collectively by the collection of program modules depicted in FIG. 1 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 1 may be implemented, at least partially, in hardware and/or firmware across any number of devices.

It should further be appreciated that any of the components of the networked architecture 100 may include alternate and/or additional hardware, software, or firmware components beyond those described or depicted without departing from the scope of the disclosure. More particularly, it should be appreciated that software, firmware, or hardware components depicted as forming part of the product dispenser 102 are merely illustrative and that some components may not be present or additional components may be provided in various embodiments. While various illustrative program modules have been depicted and described as software modules stored in data storage 126, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 2:
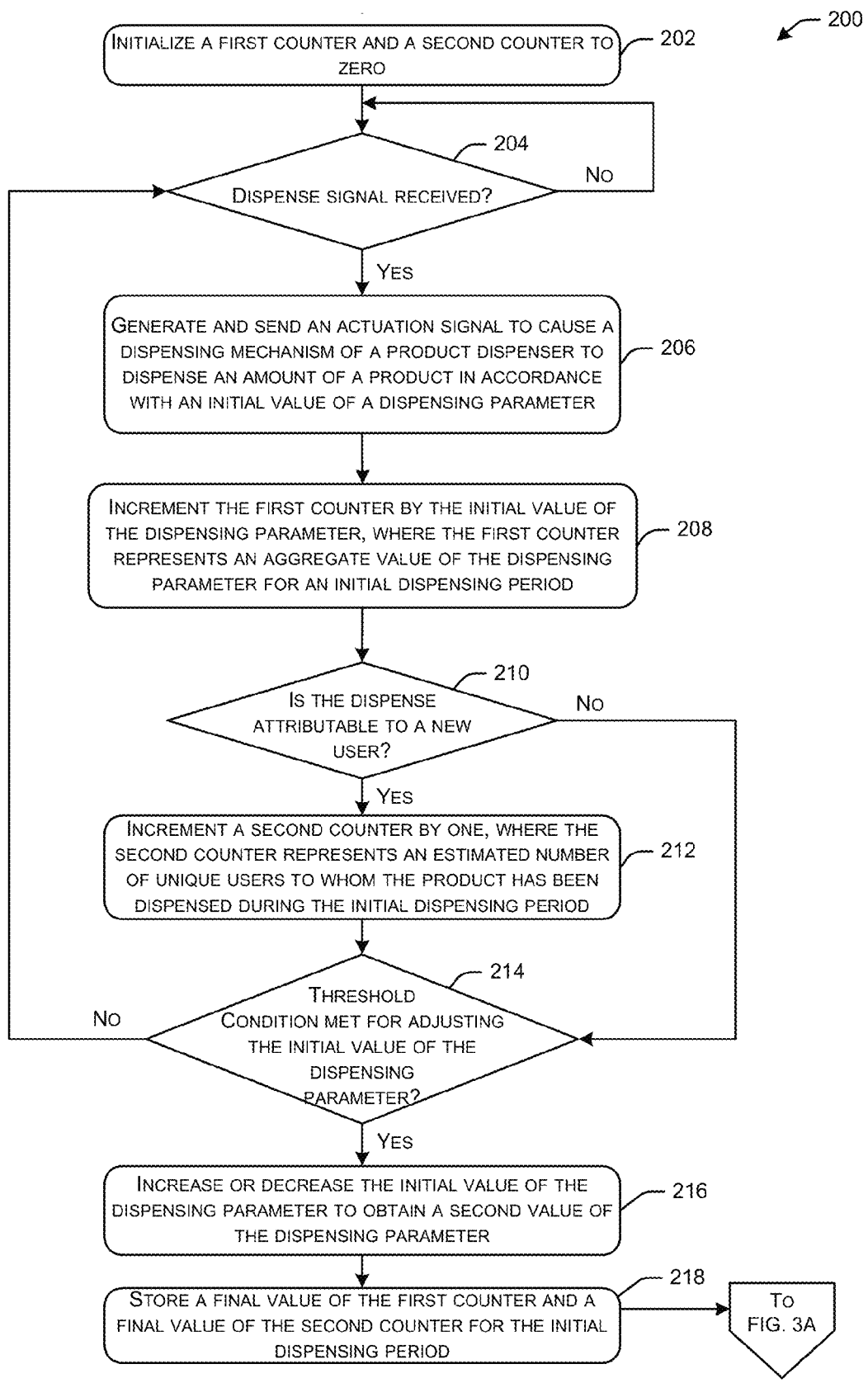
FIG. 2 is a process flow diagram of an illustrative method for maintaining a first counter representing an aggregate amount of product dispensed in accordance with an initial value of a dispensing parameter during an initial dispensing period and a second counter representing a number of unique users that received dispenses from the product dispenser during the initial dispensing period, determining that a threshold condition is met for adjusting the initial value of the dispensing parameter, and adjusting the initial value to obtain a second value of the dispensing parameter for a second dispensing period that follows the initial dispensing period in accordance with one or more example embodiments of the disclosure.

FIG. 2 is a process flow diagram of an illustrative method 200 for maintaining a first counter representing an aggregate amount of product dispensed in accordance with an initial value of a dispensing parameter during an initial dispensing period and a second counter representing a number of unique users that received dispenses from the product dispenser during the initial dispensing period, determining that a threshold condition is met for adjusting the initial value of the dispensing parameter, and adjusting the initial value to obtain a second value of the dispensing parameter for a second dispensing period that follows the initial dispensing period in accordance with one or more example embodiments of the disclosure.

At block 202, computer-executable instructions of the dispensing parameter optimization module(s) 128 may be executed to initialize a first counter and a second counter to zero. In the context of method 200, the first counter may be used to maintain a running count of an accumulated/aggregate value of a dispensing parameter during an initial dispensing period. For example, the first counter may represent, at any given point during the initial dispensing period, an aggregate amount of sheet product that has dispensed during the initial dispensing period up until that point. As another example, the first counter may represent a running count of an aggregate dispense duration for dispenses that have occurred during the initial dispensing period.

At block 204, computer-executable instructions of the dispensing control module(s) 134 may be executed to determine whether a dispense signal has been generated by/received from a sensor 120 of the product dispenser 102. If no dispense signal is detected, the determination at block 204 may be performed iteratively until a dispense signal is detected. On the other hand, if a dispense signal is detected, the controller(s) 112 may execute computer-executable instructions of the dispensing control module(s) 134 at block 206 to generate an actuation signal and communicate the actuation signal to the dispensing mechanism 136 of the product dispenser 102 to cause the dispensing mechanism 136 to dispense an amount of a product from the product supply 138. The product may be dispensed in accordance with an initial value of the dispensing parameter for the initial dispensing period. As previously noted, the dispensing parameter may be a dispense duration, a sheet product length, a volume of product, or any other suitable dispensing parameter. In an example embodiment, the initial value of the dispensing parameter may be a pre-programmed value or a value that is manually set using a physical button or switch or via user interaction with a user interface (e.g., a touch screen interface) of the product dispenser 102.

At block 208, computer-executable instructions of the dispensing parameter optimization module(s) 128 may be executed to increment the first counter by the initial value of the dispensing parameter. In certain example embodiments, rather than incrementing the first counter by the initial pre-programmed or preset initial value, the first counter may be incremented by a measured value of the dispensing parameter if, for example, the measured value deviates from the initial value because a user prematurely halted the dispensing cycle.

At block 210, computer-executable instructions of the unique user determination module(s) 132 may be executed to determine whether the dispense is attributable to a new user or the same user. For example, the unique user determination module(s) 132 may determine that the dispense is attributable to a different user than a user with whom the preceding dispense is associated if a time associated with the dispensing cycle occurred more than a threshold period of time apart from a time associated with the preceding dispensing cycle. Conversely, the unique user determination module(s) 132 may determine that the dispense is attributable to the same user as the previous dispense if a time associated with the dispensing cycle occurred within the predetermined period of time of a time associated with the preceding dispensing cycle.

In response to an affirmative determination at block 210, computer-executable instructions of the unique user determination module(s) 132 may be executed at block 212 to increment the second counter by one. In the context of method 200, the second counter may maintain a running count of the number of unique users to whom product has been dispensed up until a given point during the initial dispensing period. The method 200 may then proceed to block 214. On the other hand, in response to a negative determination at block 210, the method 200 may proceed directly to block 214 without incrementing the second counter. As will be described in more detail later in reference to FIGS. 5A-5B, the estimate of the number of unique users that used the dispenser during a dispensing period may be refined through the use of a confidence factor in order to arrive at a more accurate estimate of the actual number of users.

At block 214, computer-executable instructions of the dispensing parameter optimization module(s) 128 may be executed to determine whether a threshold condition is met for adjusting the initial value of the dispensing parameter. In the context of method 200, the threshold condition may be a condition that signals the end of the initial dispensing period such as, for example, a threshold number of dispensing cycles being reached during the initial dispensing period, a threshold number of unique users to whom product has been dispensed during the initial dispensing period, a threshold period of time having elapsed during the initial dispensing period, and so forth.

In response to a negative determination at block 214, the method 200 may return to block 204 and may be performed iteratively for each subsequent dispense request. On the other hand, in response to an affirmative determination at block 214, computer-executable instructions of the dispensing parameter value adjustment module(s) 130 may be executed at block 216 to increase or decrease the initial dispensing parameter value to obtain a second value of the dispensing parameter for a second dispensing period that follows the initial dispensing period. In certain example embodiments, the initial value of the dispensing parameter may be decreased to obtain the second value of the dispensing parameter based on a default assumption that a reduction in the amount of product dispensed per dispensing cycle may result in a reduced overall usage per user for a dispensing period. For example, if an initial sheet length of 10 inches is dispensed for each dispensing cycle during the initial dispensing period, the sheet length may be reduced to 9 inches for the subsequent second dispensing period.

At block 218, computer-executable instructions of the dispensing parameter optimization module(s) 128 may be executed to store the final values of the first and second counters for the initial dispensing period. From block 218, the method 300 may be initiated in connection with a second dispensing period that follows the initial dispensing period. Alternatively, the method 300 may be initiated in connection with any given dispensing period corresponding to operation of a product dispenser.

Figure 3A:
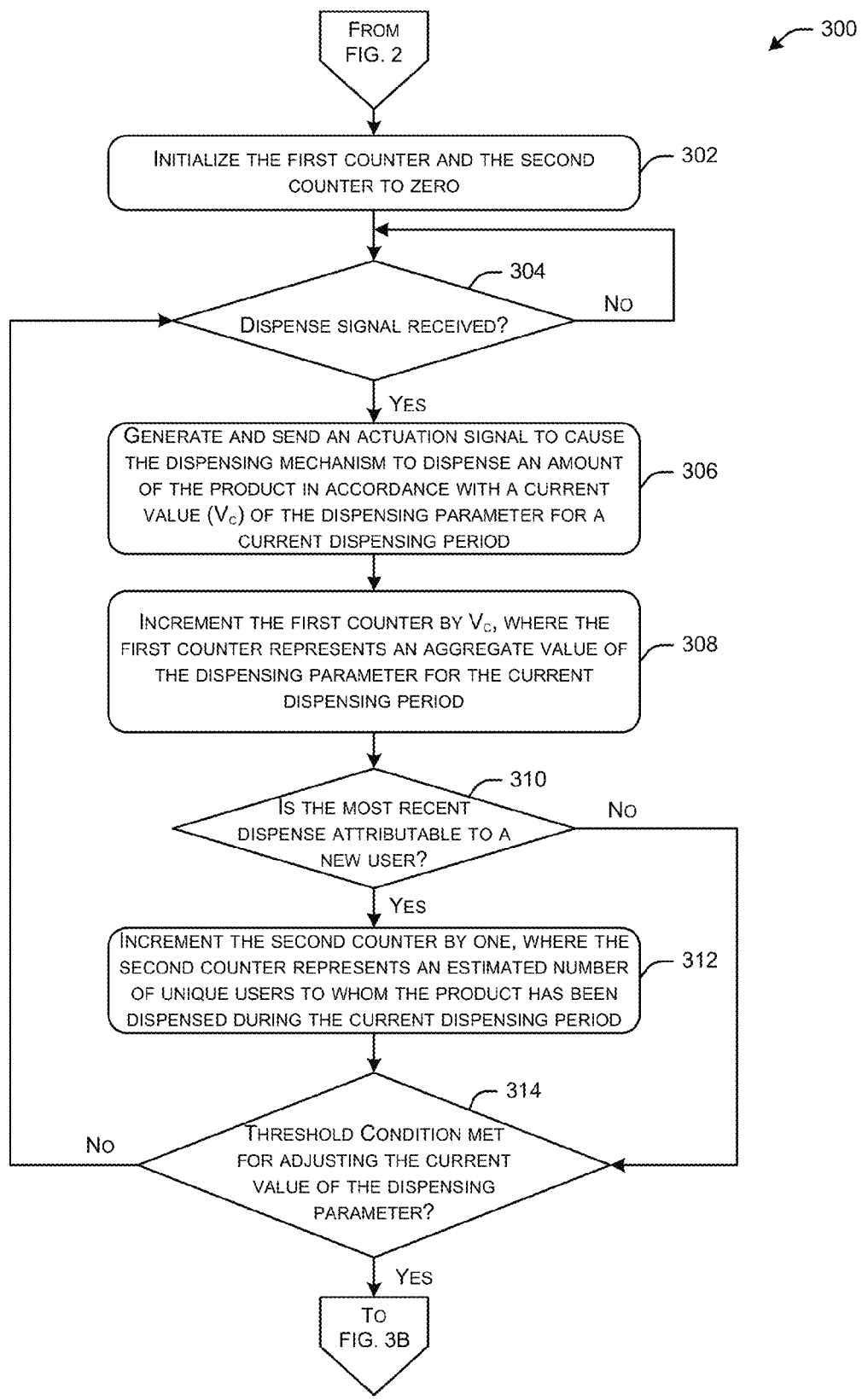
FIGS. 3A-3B are process flow diagrams of an illustrative method for optimizing a value of a dispensing parameter based on product usage data that includes maintaining a first counter representing an aggregate amount of product dispensed during a current dispensing period in accordance with a current value of a dispensing parameter and a second counter representing a number of unique users that received dispenses from the product dispenser during the current dispensing period and comparing the first counter and the second counter to corresponding stored counters associated with a previous dispensing period to determine whether and in what manner to adjust any previous value of the dispensing parameter to obtain an updated value of the dispensing parameter for any subsequent dispensing period to the current dispensing period in accordance with one or more example embodiments of the disclosure.
Figure 3B:
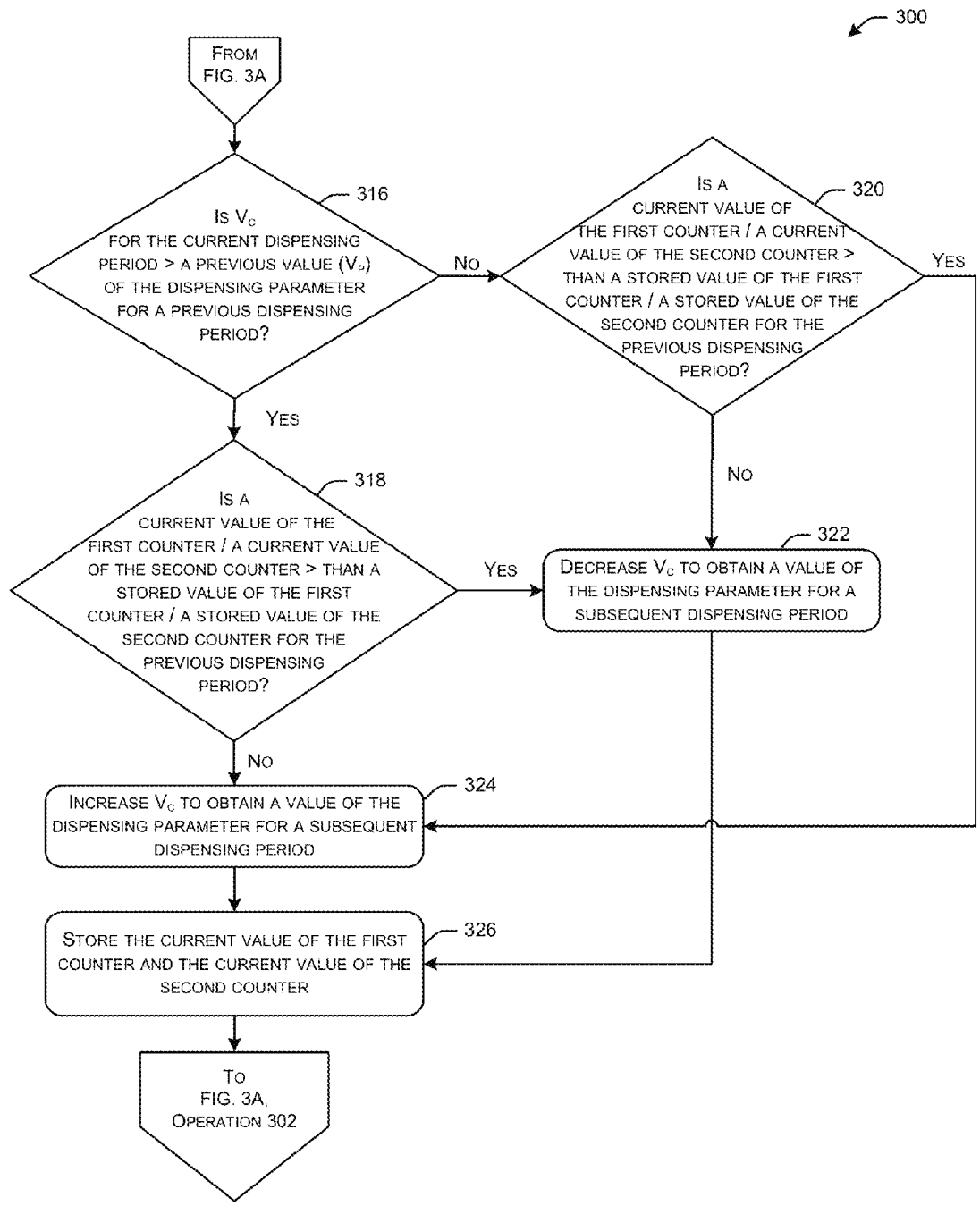

FIGS. 3A-3B are process flow diagrams of an illustrative method 300 for optimizing a value of a dispensing parameter based on product usage data that includes maintaining a first counter representing an aggregate amount of product dispensed during a current dispensing period in accordance with a current value of a dispensing parameter and a second counter representing a number of unique users that received dispenses from the product dispenser during the current dispensing period and comparing the first counter and the second counter to corresponding stored counters associated with a previous dispensing period to determine whether and in what manner to adjust any previous value of the dispensing parameter to obtain an updated value of the dispensing parameter for any dispensing period subsequent to the current dispensing period in accordance with one or more example embodiments of the disclosure. It should be appreciated that the method 300 may be performed in connection with a second dispensing period that immediately follows the initial dispensing period referenced in FIG. 2 or may be performed in connection with a second dispensing period that may represent any dispensing period that follows any previous dispensing period.

At block 302, computer-executable instructions of the dispensing parameter optimization module(s) 128 may be executed to initialize a first counter and a second counter to zero. The operations at block 302 need not be performed if separate sets of first and second counters are maintained for each dispensing period. In the context of method 300, the first counter may be used to maintain a running count of an accumulated/aggregate value of a dispensing parameter during a current dispensing period.

At block 304, computer-executable instructions of the dispensing control module(s) 134 may be executed to determine whether a dispense signal has been generated by/received from a sensor 120 of the product dispenser 102. If no dispense signal is detected, the determination at block 304 may be performed iteratively until a dispense signal is detected. On the other hand, if a dispense signal is detected, the controller(s) 112 may execute computer-executable instructions of the dispensing control module(s) 134 at block 306 to generate an actuation signal and communicate the actuation signal to the dispensing mechanism 136 of the product dispenser 102 to cause the dispensing mechanism 136 to dispense an amount of a product from the product supply 138. The product may be dispensed in accordance with a current value of the dispensing parameter for the current dispensing period. If the current dispensing period is a second dispensing period that immediately follows the initial dispensing period, the current value of the dispensing parameter may be the value generated at block 216 of method 200. If, on the other hand, the current dispensing period is a second dispensing period that follows a first dispensing period other than the initial dispensing period, the current value of the dispensing parameter for the second dispensing period may have been determined in accordance with the optimization process of method 300, as described in more detail below.

At block 308, computer-executable instructions of the dispensing parameter optimization module(s) 128 may be executed to increment the first counter by the current value of the dispensing parameter. The value of a dispensing parameter that is used to increment the first counter at block 308 may be a value determined based on a default setting (as may be the case where the immediately preceding dispensing period was the initial dispensing period), a value calculated in accordance with an optimization process disclosed herein, or a directly measured value. The value may be a measured value if, for example, the measured value deviates from the initial value because a user prematurely halted the dispensing cycle.

At block 310, computer-executable instructions of the unique user determination module(s) 132 may be executed to determine whether the dispense is attributable to a new user or the same user. In response to an affirmative determination at block 310, computer-executable instructions of the unique user determination module(s) 132 may be executed at block 312 to increment the second counter by one. In the context of method 300, the second counter may maintain a running count of the number of unique users to whom product has been dispensed up until a given point during the current dispensing period. The method 300 may then proceed to block 314. On the other hand, in response to a negative determination at block 310, the method 300 may proceed directly to block 314 without incrementing the second counter.

At block 314, computer-executable instructions of the dispensing parameter optimization module(s) 128 may be executed to determine whether a threshold condition is met for adjusting the current value of the dispensing parameter. In the context of method 300, the threshold condition may be a condition that signals the end of the current dispensing period such as, for example, a threshold number of dispensing cycles being reached during the current dispensing period, a threshold number of unique users to whom product has been dispensed during the current dispensing period, a threshold period of time having elapsed during the current dispensing period, and so forth.

In response to a negative determination at block 314, the method 300 may return to block 304 and may be performed iteratively for each subsequent dispense request. On the other hand, in response to an affirmative determination at block 314, computer-executable instructions of the dispensing parameter value adjustment module(s) 130 may be executed to perform various comparisons including a comparison between the current value of dispensing parameter and a previous value of the dispensing parameter for a previous dispensing period and a comparison of a ratio of the current value of the first counter to the current value of the second counter for the current dispensing period and a ratio of a previous value of the first counter to a previous value of the second counter for that previous dispensing period. The operations of blocks 316-324 may represent the algorithmic logic embodied in the table provided previously herein.

More specifically, referring now to FIG. 3B, computer-executable instructions of the dispensing parameter optimization module(s) 128 may be executed at block 316 to determine whether a current value of the dispensing parameter for the current dispensing period is greater than a previous value of the dispensing parameter for a previous dispensing period. In response to a negative determination at block 316, the method may proceed to block 320. At block 320, computer-executable instructions of the dispensing parameter optimization module(s) 128 may be executed to determine whether a ratio of the current first counter to the current second counter (e.g., aggregate usage per user for the current dispensing period) is greater than a ratio of a previous value of the first counter to a previous value of the second counter for a previous dispensing period (e.g., aggregate usage per user for a dispensing period that preceded the current dispensing period).

In response to an affirmative determination at block 320, the method 300 may proceed to block 324, where computer-executable instructions of the dispensing parameter value adjustment module(s) 130 may be executed to increase the current value of the dispensing parameter to obtain an increased dispensing parameter value for the next dispensing period. On the other hand, in response to a negative determination at block 320, the method 300 may proceed to block 322, where computer-executable instructions of the dispensing parameter value adjustment module(s) 130 may be executed to decrease the current value of the dispensing parameter to obtain a decreased dispensing parameter value for the next dispensing period.

Referring again to block 316, in response to an affirmative determination, the method may proceed to block 318, where computer-executable instructions of the dispensing parameter optimization module(s) 128 may be executed to determine whether a ratio of the current first counter to the current second counter (e.g., aggregate usage per user for the current dispensing period) is greater than a ratio of a previous value of the first counter to a previous value of the second counter for a previous dispensing period (e.g., aggregate usage per user for a dispensing period that preceded the current dispensing period).

In response to a negative determination at block 318, the method 300 may proceed to block 324, where computer-executable instructions of the dispensing parameter value adjustment module(s) 130 may be executed to increase the current value of the dispensing parameter to obtain an increased dispensing parameter value for the next dispensing period. On the other hand, in response to a positive determination at block 318, the method 300 may proceed to block 322, where computer-executable instructions of the dispensing parameter value adjustment module(s) 130 may be executed to decrease the current value of the dispensing parameter to obtain a decreased dispensing parameter value for the next dispensing period.

From either block 324 or block 322, the method 300 may proceed to block 326, where computer-executable instructions of the dispensing parameter optimization module(s) 128 may be executed to store the current values of the first and second counters. Method 300 may then be performed again for a subsequent dispensing period in which dispensing cycles are performed in accordance with the value generated at block 324 or the value generated at block 322. The method 300 may be performed for any number of dispensing periods until an optimized value or optimized range of values for the dispensing parameter is reached. In certain example embodiments, the method 300 may be repeated until a difference in aggregate usage per user between any two (e.g., successive) dispensing periods is within a predetermined threshold. In other example embodiments, the dispensing parameter value may be iteratively adjusted until no change in the aggregate usage per user is observed for some threshold number of iterations. In other example embodiments that dispensing parameter value may be iteratively adjusted indefinitely or as long as the dispenser is operational.

In certain example embodiments, an adjustment in the current dispensing parameter value to obtain the dispensing parameter value for the next dispensing period may result in no change in the aggregate usage per user. In such example embodiments, the current dispensing parameter value may nonetheless be increased or decreased to obtain a dispensing parameter value for the next dispensing period. For example, in those example embodiments, in which the aggregate usage per user is unchanged from a previous dispensing period to a current dispensing period, the direction in which the current dispensing parameter value is adjusted (e.g., whether the current dispensing parameter value is increased or decreased to obtain the dispensing parameter value for the next dispensing period) may be the same as a direction in which the previous dispensing parameter value was adjusted to obtain the current dispensing parameter value.

As previously noted, while the example method 300 has been described in connection with adjusting the current dispensing parameter value to obtain the dispensing parameter value for a subsequent dispensing period, it should be appreciated that the results of comparing the usage data for a current dispensing period to usage data for a previous dispensing period may be used to adjust a dispensing parameter value associated with any previous dispensing period to obtain the dispensing parameter value for a subsequent dispensing period. Further, as previously noted, while the example method 300 has been described in connection with maintaining a first counter of an aggregate value of the dispensing parameter and a second counter of the number of unique users, in other example embodiments, a running average of the usage rate for a dispensing period (e.g., aggregate value of the dispensing parameter/number of unique users) may be maintained in lieu of, or in addition to, maintaining the first and/or second counters.

Figure 4:
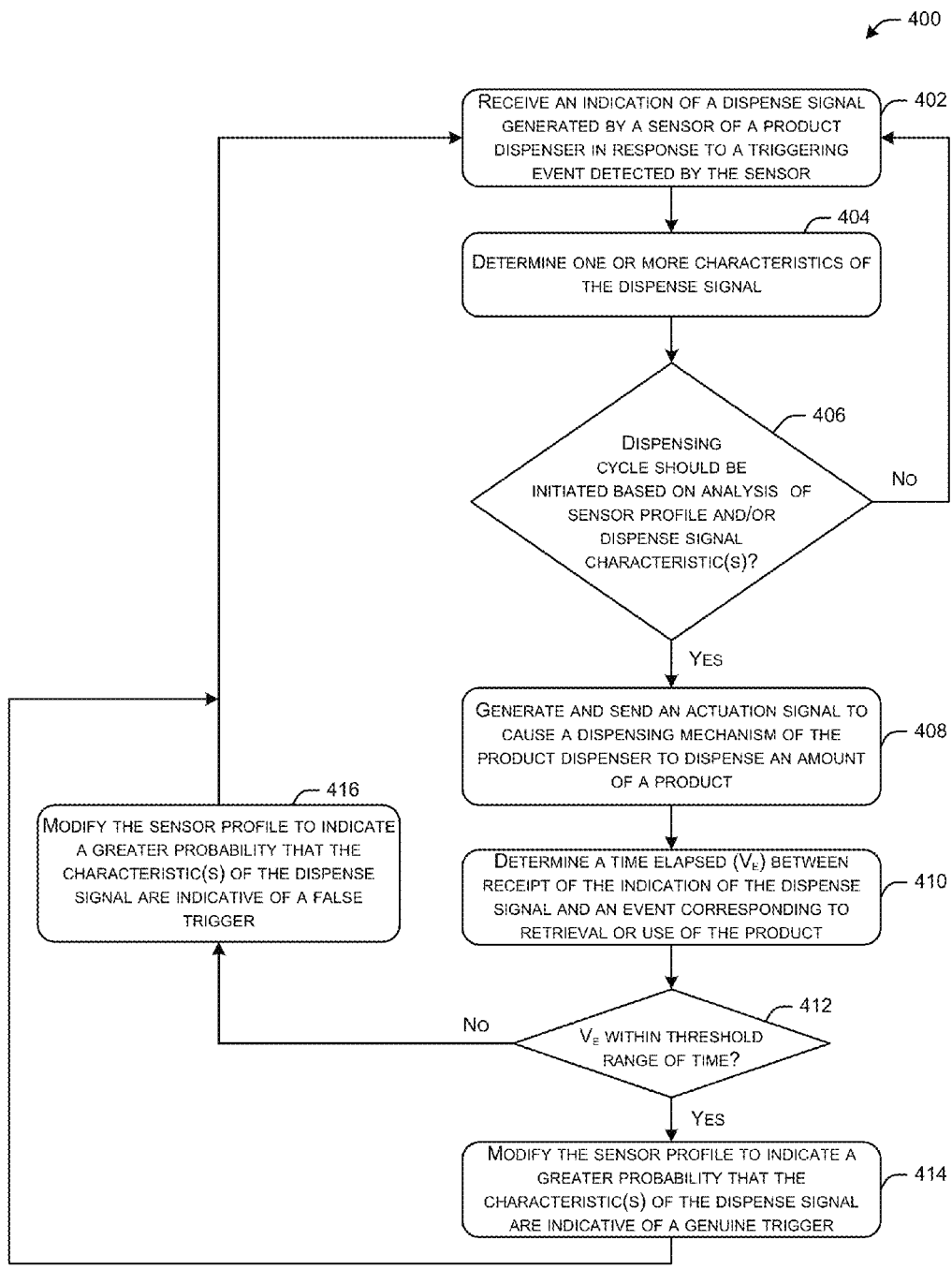
FIG. 4 is a process flow diagram of an illustrative method for optimizing a capability of a product dispenser to distinguish between genuine and false triggers of a user sensor in accordance with one or more example embodiments of the disclosure.

FIG. 4 is a process flow diagram of an illustrative method 400 for optimizing a capability of a product dispenser to distinguish between genuine and false triggers of a user sensor in accordance with one or more example embodiments of the disclosure.

At block 402, an indication may be received of a dispense signal generated by a sensor 120 of the product dispenser 102 in response to a triggering event detected by the sensor 120.

At block 404, computer-executable instructions of the dispensing parameter optimization module(s) 128 may be executed to determine one or more characteristics of the dispense signal. A characteristic of the dispense signal may include, without limitation, an amplitude of the dispense signal, a frequency of the dispense signal, a waveform of the dispense signal, or the like.

At block 406, computer-executable instructions of the dispensing parameter optimization module(s) 128 may be executed to access a sensor profile associated with the sensor 120 to determine, based at least in part on the sensor profile, whether the characteristic(s) of the dispense signal are associated with at least a threshold probability of being indicative of a genuine user-initiated triggering event. In certain example embodiments, the determination at block 406 may include determining that the sensor profile includes or is otherwise associated with a second signal characteristic that matches a first signal characteristic of the dispense signal within a specified tolerance, determining a probability that the second signal characteristic is indicative of a genuine user-initiated triggering event, and further determining that the probability exceeds a threshold probability value. For example, if the first signal characteristic of the dispense signal is a frequency of the dispense signal, the second signal characteristic may be a frequency of a previously received dispense signal. If the two frequencies are within a threshold value of one another, and if a probability that the frequency of the previously received dispense signal is indicative of a genuine user-initiated triggering event meets or exceeds a threshold probability value, a dispensing cycle may be initiated in response to the dispense signal. On the other hand, if the first signal characteristic of the current dispense signal matches a second signal characteristic associated with the sensor profile within a specified tolerance, and if a probability that the second signal characteristic is indicative of a genuine user-initiated triggering event does not meet or exceed the threshold probability value, the dispensing cycle may not be initiated. The threshold probability value may be any suitable value. In certain example embodiments, the threshold probability value may be lower in earlier stages of an optimization process in order to allow for dispenses in more situations, and thus, obtain more data for refining the sensor profile. As the sensor profile becomes more refined, and thus, more capable of distinguishing between genuine and false triggers, the threshold probability value may be increased. In addition, as previously noted, a probability that a dispense signal is indicative of a false trigger may be used and compared to a corresponding threshold probability value in lieu of, or in addition to, a probability that the dispense signal is indicative of a genuine user triggering event.

If, based on an evaluation of the current dispense signal with respect to the sensor profile, a negative determination is made at block 406, then the method 400 may proceed again iteratively from block 402. If, on the other hand, an affirmative determination is made at block 406, the controller(s) 112 may, at block 408, execute computer-executable instructions of the dispensing control module(s) 134 to generate an actuation signal to cause the dispensing mechanism 136 of the product dispenser 102 to dispense an amount of product.

At block 410, the controller(s) 112 may execute the computer-executable instructions of the dispensing parameter optimization module(s) 128 to determine a time that elapses between receipt of the dispense signal (or generation of the actuation signal or completion of the dispensing cycle) and receipt of an indication that the product has been used or retrieved. In other embodiments, the computer-executable instructions may determine a time that elapsed during continuous receipt of the dispense signal. If the product dispenser dispenses towel, retrieval of the dispensed product may be determined based on activation of a tear sensor. If the product dispenser dispenses solids, liquids, gases, or a mixed-phase product such as an aerosol, foam, gel, or the like, such as soap, use/retrieval of the dispensed product may be determined from the completion of a continuous receipt of the dispense signal.

At block 412, the controller(s) 112 may execute computer-executable instructions of the dispensing parameter optimization module(s) 128 to determine whether the elapsed time is within a predetermined threshold range of time. In response to an affirmative determination at block 412, that is, a determination that the elapsed time was within the threshold range of time from a time corresponding to receipt of the dispense signal, generation of the actuation signal, initiation of the dispensing cycle, or completion of the dispensing cycle, then the method 400 may proceed to block 414, where computer-executable instructions of the dispensing parameter optimization module(s) 128 may be executed to modify the sensor profile to indicate an increased likelihood that the characteristic(s) of the dispense signal are indicative of a genuine user trigger, and therefore, a decreased likelihood that the characteristic(s) of the dispense signal are indicative of a genuine trigger.

In response to a negative determination at block 412, that is, a determination that the elapsed time was not within the threshold range of time, then the method 400 may proceed to block 416, where the controller(s) 112 may execute computer-executable instructions of the dispensing parameter optimization module(s) 128 to modify the sensor profile to indicate a decreased likelihood that the characteristic(s) of the dispense signal are indicative of a genuine user trigger, and therefore, an increased likelihood that characteristic(s) of the dispense signal are indicative of a false trigger. From block 414 or block 416, the method 400 may proceed to block 402 and may again proceed iteratively therefrom. The method 400 may continue iteratively such that the sensor profile is refined over time to more accurately distinguish dispense signals indicative of genuine user triggers from dispense signals indicative of false triggers.

Figure 5A:
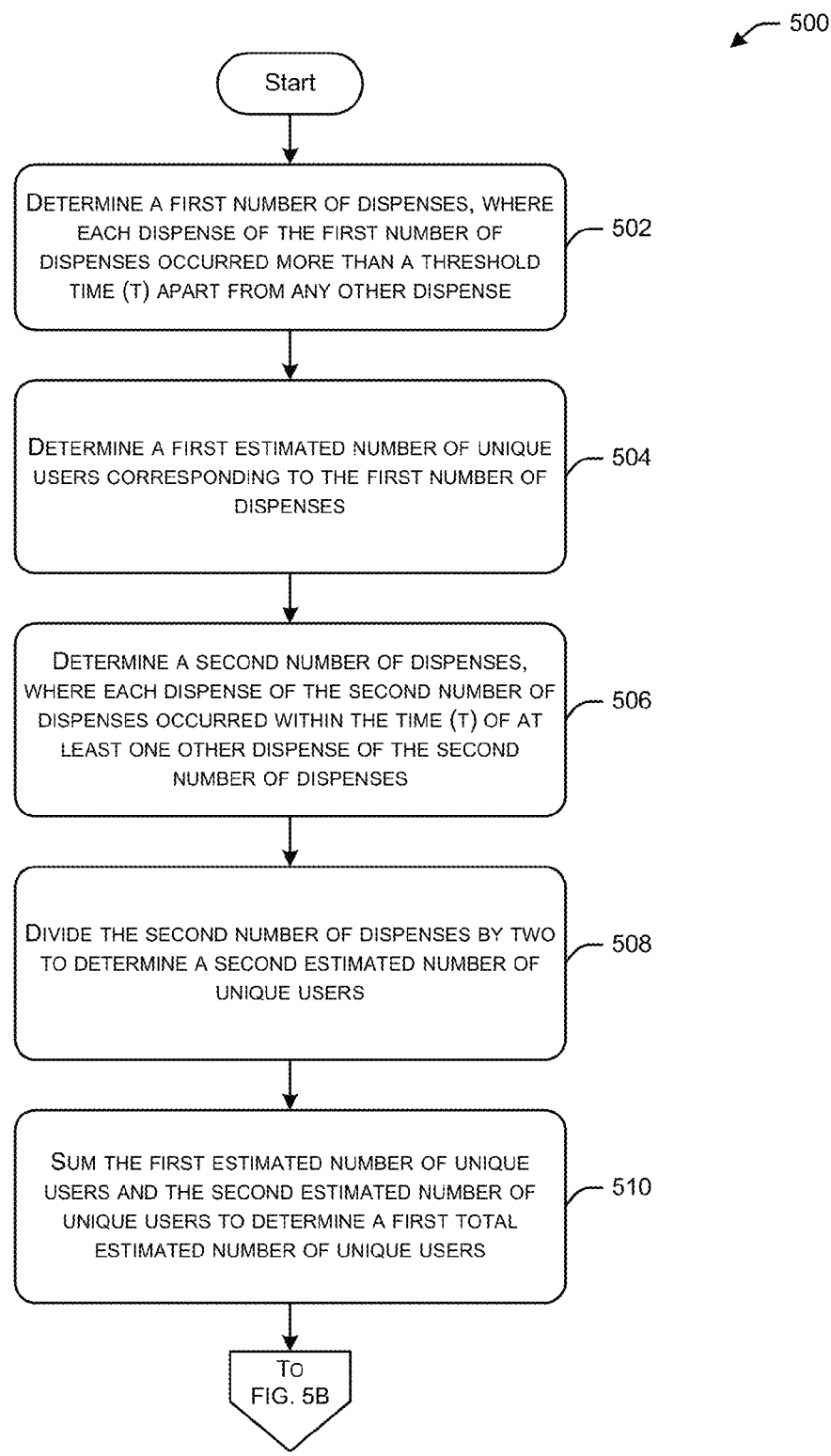
FIGS. 5A-5B are process flow diagrams of an illustrative method for iteratively refining an estimate of a number of unique users that received dispenses from a product dispenser during a dispensing period in accordance with one or more example embodiments of the disclosure.
Figure 5B:
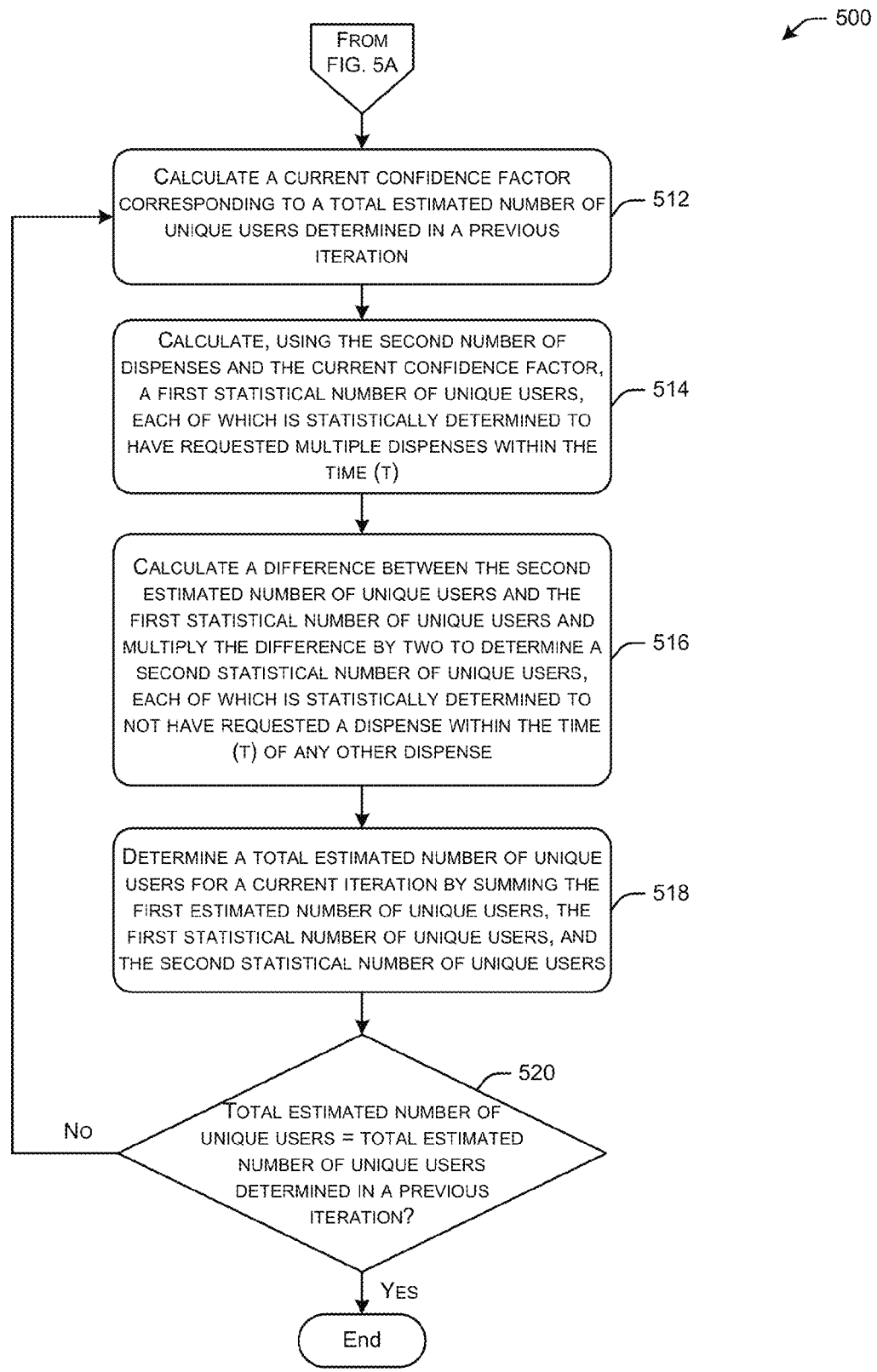

FIGS. 5A-5B are process flow diagrams of an illustrative method 500 for iteratively refining an estimate of a number of unique users that received dispenses from a product dispenser during a dispensing period in accordance with one or more example embodiments of the disclosure. One or more operations of the method 500 may be performed responsive to execution of computer-executable instructions of the unique user determination module(s) 132 by the controller(s) 112.

Method 500 involves the use of a confidence factor to statistically improve the estimate of the number of users that receive dispenses over a period of time (e.g., during a dispensing period). As previously mentioned, the confidence factor may represent an approximate probability that two dispenses that occurred within the threshold period of time were to the same user. A confidence factor may be determined for a given set of usage data. In certain example embodiments, the usage data may be simulated usage data. Alternatively, actual usage data may be used. In those example embodiments in which simulated usage data is used, the simulated usage data may include randomly generated times at which a simulated group of users requests dispenses from a product dispenser. The times of the dispense requests may be ordered and an elapsed time between each successive pair of dispense requests may be determined. A respective number of occurrences for each elapsed time may then be determined. The number of occurrences for a given elapsed time may correspond to a number of pairs of dispenses that include dispenses that occurred within the elapsed time of one another.

A moving average for the distribution of the respective number of occurrences for each elapsed time may be then determined. Multiple data points may then be selected that are sufficient to determine a best-fit regression line for the distribution. The best-fit regression line and the total number of users to whom the usage data relates may then be used to determine, for each elapsed time, a probability that two users will request dispenses separated by that elapsed time. A cumulative probability may also be determined with respect to each elapsed time, where the cumulative probability represents a probability that two users will request dispenses that are separated by that elapsed time or any shorter interval of time. The above-described process may be repeated for multiple usage datasets corresponding to different amounts of user traffic (e.g., different numbers of users per hour). In this manner, for each group consisting of a different number of users per hour, a respective cumulative probability that two users will randomly request dispenses within a selected threshold period of time (e.g., 10 seconds) may be determined. Corresponding confidence factors may also be calculated for each group. For any given group of users, the corresponding confidence factor for the threshold period of time may equal 1 minus the corresponding cumulative probability for the threshold period of time. The confidence factors may then be plotted against the corresponding user traffic rates (e.g., number of users per hour) and a best-fit regression line may be determined. An equation representing this best-fit regression line may be used to statistically approximate the confidence factor corresponding to any given user traffic rate.

Example data showing cumulative probabilities and confidence factors corresponding to different user traffic rates and the approximate equation of the corresponding best-fit regression line are shown below.

| Users per Hour | 60 | 25 | 14 | 10 |
|---|---|---|---|---|
| Cumulative Probability for Threshold Period of Time of 10 s | 18.0% | 7.5% | 4.7% | 3.5% |
| Confidence Factor | 82% | 92.5% | 95.3% | 96.5% |

$$C(\%)=100\%-0.29\%*(\# \text{ of users/hr}) \qquad \text{Eq(1):}$$

It should be appreciated that the above-described process is merely an illustrative way to determine the confidence factor. For example, user traffic may be measured using a different time frame than an hour. Further, a different threshold of time may be chosen which, in turn, would correspond to different confidence factors and different cumulative probabilities. Further, the confidence factor may be determined using any suitable statistical approach and need not be determined based on simulated usage data.

One or more confidence factors—as determined from Eq(1) for example—may be used to successively refine an estimate of a number of unique users that receive product dispenses over some period of time (e.g., a dispensing period). Referring to FIG. 5A, blocks 502-510 may include operations to determine an initial estimate of the number of unique users over a period of time (e.g., over the course of a dispensing period). A period of 10 seconds will be used as an example threshold period of time for ease of explanation in describing the operations of method 500. However, it should be appreciated that any suitable threshold period of time may be chosen.

At block 502, a first number of dispenses, each of which did not occur within, for example, 10 seconds of any other dispense, may be determined. Stated another way, a first number of dispenses may be determined, each of which occurred more than 10 seconds apart from any other dispense. At block 504, a first estimated number of unique users corresponding to the first number of dispenses may be determined. The first estimated number of unique users may equal the first number of dispenses.

At block 506, a second number of dispenses may then be determined. Each dispense in the second number of dispenses may have occurred within, for example, 10 seconds of at least one other dispense in the second number of dispenses. At block 508, the second number of dispenses may then be divided by two to obtain a second estimated number of unique users (based on the assumption that each pair of dispenses that occurred within 10 seconds of one another were received by the same user).

At block 510, the first estimated number of unique users and the second estimated number of unique users may then be summed to obtain a first total estimated number of unique users.

FIG. 5B generally depicts any iteration of a process for refining an estimate of a number of unique users. While FIG. 5B will be described in connection with a second iteration following the initial operations depicted in FIG. 5A, it should be appreciated that the operations of FIG. 5B may correspond to any iteration of the process for refining the estimate. Referring now to FIG. 5B, at block 512, a confidence factor may be determined for the first total estimated number of unique users. For example, the confidence factor may be determined by inserting the first estimated total number of users into Eq(1) from above. At block 514, a first statistical number of unique users may be determined using the confidence factor determined at block 512, each of whom is statistically assumed to have received at least two dispenses within 10 seconds of each other. The first statistical number of unique users may be determined by multiplying the second number of dispenses by the confidence factor and dividing the result by two.

At block 516, a second statistical number of unique users, each of whom is statistically determined to have received a dispense more than 10 seconds apart from any other dispense, may then be determined. The second statistical number of unique users may be determined by subtracting the first statistical number of unique users from the second estimated number of unique users. At block 518, the first estimated number of unique users, the first statistical number of unique users, and the second statistical number of unique users may then be summed to obtain a second total estimated number of unique users.

At block 520, a determination may be made as to whether the second total estimated number of unique users equals the first total estimated number of unique users. In response to a negative determination at block 520 (e.g., if the difference between the first total and the second total is non-zero), the method 500 may be repeated from block 512. More specifically, a new confidence factor may be determined based on the second total estimated number of unique users, and the operations of FIG. 5B may be repeated using the second confidence factor to obtain a third total estimated number of unique users. The operations of FIG. 5B may be iteratively performed to refine the estimate of the number of actual unique users until the statistical estimate is unchanged from one iteration to the next. It should be appreciated that, in certain example embodiments, a positive determination may be made at block 520 if the total estimated number of unique users for the current iteration and the total estimated number of unique users for a previous iteration are within some threshold difference from one another.

One or more operations of the methods 200-500 may have been described above as being performed by a product dispenser 102, or more specifically, by one or more program modules executing on such a device. It should be appreciated, however, that any of the operations of methods 200-500 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 200-500 may be described in the context of the illustrative product dispenser 102, it should be appreciated that such operations may be implemented in connection with numerous other device configurations.

The operations described and depicted in the illustrative methods of FIGS. 2-5B may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-5B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

That which is claimed is:

1. A method, the method comprising:
   determining, by a controller of a product dispenser, a first value of a dispensing parameter;
   causing, by the controller, a dispensing mechanism of the product dispenser to perform each of a first number of dispenses of the product in accordance with the first value of the dispensing parameter during a first dispensing period;
   sensing, by at least one of a user sensor of the product dispenser, a tear sensor of the product dispenser, or other type sensor of the product dispenser that is configured to sense the occurrence of a dispense, the first number of dispenses;
   sensing, by a time sensor of the product dispenser, time data associated with each of the first number of dispenses, wherein the time data comprises at least one of a time associated with each of the first number of dispenses or a time period between each of the first number of dispenses;
   determining, by the controller, a first number of unique users associated with the first number of dispenses;
   determining, by the controller, a first usage rate of the product for the first dispensing period, wherein the first usage rate is indicative of a first ratio of i) a first aggregate amount of the product dispensed for the first number of dispenses to ii) the first number of unique users;
   determining, by the controller, a second value of the dispensing parameter, wherein the second value of the dispensing parameter is different from the first value of the dispensing parameter;
   causing, by the controller, the dispensing mechanism to perform each of a second number of dispenses of the product in accordance with the second value of the dispensing parameter during a second dispensing period;
   sensing, by the at least one of the user sensor of the product dispenser, the tear sensor of the product dispenser, or the other type sensor of the product dispenser that is configured to sense the occurrence of a dispense, the second number of dispenses;
   sensing, by the time sensor of the product dispenser, time data associated with each of the second number of dispenses, wherein the time data comprises at least one of a time associated with each of the second number of dispenses or a time period between each of the second number of dispenses;
   determining, by the controller, a second number of unique users associated with the second number of dispenses;
   determining, by the controller, a second usage rate of the product for the second dispensing period, wherein the second usage rate is indicative of a second ratio of i) a second aggregate amount of the product dispensed for the second number of dispenses to ii) the second number of unique users; and
   determining, by the controller, whether to increase, decrease, or maintain the second value of the dispensing parameter to obtain a third value of the dispensing parameter for a third dispensing period based at least in part on a first comparison of the first value of the dispensing parameter to the second value of the dispensing parameter and a second comparison of the first ratio to the second ratio.

2. The method of claim 1, wherein determining whether to increase or decrease the second value of the dispensing parameter to obtain the third value of the dispensing parameter comprises:
determining, by the controller, that the second value of the dispensing parameter is less than the first value of the dispensing parameter;
determining, by the controller, that the first ratio is less than the second ratio; and
increasing, by the controller, the second value of the dispensing parameter to obtain the third value of the dispensing parameter.

3. The method of claim 1, wherein determining whether to increase or decrease the second value of the dispensing parameter to obtain the third value of the dispensing parameter comprises:
determining, by the controller, that the second value of the dispensing parameter is less than the first value of the dispensing parameter;
determining, by the controller, that the first ratio is greater than the second ratio; and
decreasing, by the controller, the second value of the dispensing parameter to obtain the third value of the dispensing parameter.

4. The method of claim 1, wherein determining whether to increase or decrease the second value of the dispensing parameter to obtain the third value of the dispensing parameter comprises:
determining, by the controller, that the second value of the dispensing parameter is greater than the first value of the dispensing parameter;
determining, by the controller, that the first ratio is less than the second ratio; and
decreasing, by the controller, the second value of the dispensing parameter to obtain the third value of the dispensing parameter.

5. The method of claim 1, wherein determining whether to increase or decrease the previous value of the dispensing parameter to obtain the third value of the dispensing parameter comprises:
determining, by the controller, that the second value of the dispensing parameter is greater than the first value of the dispensing parameter;
determining, by the controller, that the first ratio is greater than the second ratio; and
increasing, by the controller, the previous value of the dispensing parameter to obtain the third value of the dispensing parameter.

6. The method of claim 1, further comprising:
determining a first portion of the first number of dispenses, wherein each dispense in the first portion occurred more than a threshold time apart from any other dispense of the first number of dispenses;
determining a second portion of the first number of dispenses, wherein each dispense in the second portion occurred less than the threshold time apart from at least one other dispense in the second portion;
determining a third number of dispenses in the first portion and a fourth number of dispenses in the second portion;
determining a first estimated number of unique users equal to the third number of dispenses;
determining a second estimated number of unique users by dividing the fourth number of dispenses by two to obtain an integer result, wherein the integer result is the second estimated number of unique users; and
determining the first number of users by summing the first estimated number of unique users and the second estimated number of unique users.

7. A method, the method comprising:
determining, by at least one controller, a first value of a dispensing parameter;
determining a first usage rate of the product per user for a first dispensing period, wherein the first dispensing period comprises a first number of dispenses of product by at least one dispensing mechanism of the one or more product dispensers, wherein the first number of dispenses are performed in accordance with the first value of the dispensing parameter and determined using at least one of a user sensor of the product dispenser, a tear sensor of the product dispenser, or other type sensor of the product dispenser that is configured to sense the occurrence of a dispense associated with the at least one dispensing mechanism, wherein time data associated with each of the first number of dispenses is sensed using a time sensor associated with the at least one dispensing mechanism, wherein the first usage rate is based on a first accumulated value corresponding to the dispensing parameter for the first number of dispenses and a first number of users;
determining a second value of the dispensing parameter, wherein the second value of the dispensing parameter is different from the first value of the dispensing parameter;
determining a second usage rate of the product per user for a second dispensing period, wherein the second dispensing period comprises a second number of dispenses of product by the at least one dispensing mechanism of the one or more product dispensers, wherein the second number of dispenses are performed in accordance with the second value of the dispensing parameter and determined using the at least one of the user sensor of the product dispenser, the tear sensor of the product dispenser, or the other type sensor of the product dispenser that is configured to sense the occurrence of a dispense associated with the at least one dispensing mechanism, wherein time data associated with each of the second number of dispenses is sensed using the time sensor associated with the at least one dispensing mechanism, wherein the second usage rate is based on a second accumulated value corresponding to the dispensing parameter for the second number of dispenses and a second number of users; and
determining a third value of the dispensing parameter for a third dispensing period based at least in part on the first value, the second value, the first usage rate, and the second usage rate.

8. The method of claim 7, wherein determining the third value of the dispensing parameter for the third dispensing period comprises:
determining that the second value is less than the first value; and
determining the third value of the dispensing parameter based at least in part on a comparison between the first usage rate and the second usage rate,
wherein a previous value of the dispensing parameter is decreased to obtain the third value responsive to determining that the first usage rate is greater than the second usage rate, the previous value is increased to obtain the third value responsive to determining that the first usage rate is less than the second usage rate, or the third value is determined based at least in part on one or more historical values of the dispensing parameter responsive to determining that first usage rate is equal to the second usage rate.

9. The method of claim 7, wherein determining the third value of the dispensing parameter for the third dispensing cycle comprises:
determining that the second value is greater than the first value; and
determining the third value of the dispensing parameter based at least in part on a comparison between the first usage rate and the second usage rate,
wherein a previous value of the dispensing parameter is increased to obtain the third value responsive to determining that the first usage rate is greater than the second usage rate, the previous value is decreased to obtain the third value responsive to determining that the that the first usage rate is less than the second usage rate, or the third value is determined based at least in part on one or more historical values responsive to determining that the first usage rate is equal to the second usage rate.

10. The method of claim 7, further comprising:
determining a first portion of the first number of dispenses, wherein each dispense in the first portion occurred more than a threshold time apart from any other dispense of the first number of dispenses;
determining a second portion of the first number of dispenses, wherein each dispense in the second portion occurred less than the threshold time apart from at least one other dispense in the second portion;
determining a third number of dispenses in the first portion and a fourth number of dispenses in the second portion;
determining a first estimated number of unique users equal to the third number of dispenses;
determining a second estimated number of unique users by dividing the fourth number of dispenses by two to obtain an integer result, wherein the integer result is the second estimated number of unique users; and
determining the first number of users by summing the first estimated number of unique users and the second estimated number of unique users.

11. The method of claim 10, wherein the first number of users is a first total estimated number of unique users for the first dispensing period, the method further comprising:
determining a confidence factor based at least in part on the first total estimated number of unique users;
determining a first statistical number of unique users based at least in part on the fourth number of dispenses and the confidence factor, wherein each user in the first statistical number of unique users is estimated to have received a respective dispense that occurred within the threshold time from a respective dispense received by at least one other user in the first statistical number of unique users;
determining a second statistical number of unique users based at least in part on the second estimated number of unique users and the first statistical number of unique users; and
determining a second total estimated number of unique users for the first dispensing period by summing the first estimated number of unique users, the first statistical number of unique users, and the second statistical number of unique users.

12. The method of claim 11, wherein determining the second statistical number of unique users comprises:

determining a difference between the second estimated number of unique users and the first statistical number of unique users; and
multiplying the difference by two to obtain the second statistical number of unique users.

13. The method of claim 11, wherein the confidence factor is a first confidence factor, the method further comprising:
determining that the second total estimated number of unique users is different from the first total estimated number of unique users;
determining a second confidence factor based at least in part on the second total estimated number of unique users; and
determining a third total estimated number of unique users based at least in part on the second confidence factor.

14. The method of claim 7, further comprising:
determining that a particular dispense of the first number of dispenses is associated with a particular value of the dispensing parameter that differs from the first value of the dispensing parameter,
wherein the first accumulated value for the dispensing parameter comprises the particular value of the dispensing parameter for the particular dispense instead of the first value of the dispensing parameter.

15. The method of claim 7, wherein the dispensing parameter comprises a product amount of a proxy for the product amount, and wherein the proxy comprises at least one of a dispense duration, a sheet product length, a volume of the product, or a concentration of the product.

16. The method of claim 7, further comprising:
determining that a threshold condition is satisfied;
adjusting the first value of the dispensing parameter to obtain the second value of the dispensing parameter responsive to determining that the threshold condition is satisfied; and
initiating the second dispensing period.

17. The method of claim 16, wherein determining that the threshold condition is satisfied comprises determining that the first number of users equals a threshold number of users or determining that a threshold amount of time has elapsed during the first dispensing period.

18. The method of claim 7, wherein the at least one controller comprises at least one of a first controller provided in the product dispenser and a second controller provided in a server communicatively coupled to the product dispenser via one or more networks.

19. The method of claim 7, wherein determining the third value comprises determining the third value to be one of the same as the first value, the same as the second value, or different than the first value and the second value.

20. A product dispenser, the product dispenser comprising:
a dispensing apparatus;
at least one of a user sensor of the product dispenser, a tear sensor of the product dispenser, or other type sensor of the product dispenser that is configured to sense the occurrence of a dispense;
a time sensor;
at least one memory with computer-executable instructions stored thereon; and
a controller operatively coupled to the dispensing apparatus and the at least one memory, wherein the controller is configured to access the at least one memory and execute the computer-executable instructions to:
determine a first value of a dispensing parameter;

generate a first number of actuation signals that cause the dispensing apparatus to perform a first number of dispenses of the product to a first number of users during a first dispensing period in accordance with the first value of the dispensing parameter;

sense, by the at least one of the user sensor of the product dispenser, the tear sensor of the product dispenser, or the other type sensor of the product dispenser that is configured to sense the occurrence of a dispense, the first number of dispenses;

sense, by the time sensor, time data associated with each of the first number of dispenses, wherein the time data comprises at least one of a time associated with each of the first number of dispenses or a time period between each of the first number of dispenses;

determine a first usage rate of the product per user for the first dispensing period, wherein the first usage rate is based on a first accumulated value corresponding to the dispensing parameter for the first number of dispenses and the first number of users;

determine a second value of the dispensing parameter, wherein the second value of the dispensing parameter is different from the first value of the dispensing parameter;

generate a second number of actuation signals that cause the dispensing apparatus to perform a second number of dispenses of the product to a second number of users during a second dispensing period in accordance with the second value of the dispensing parameter;

sense, by the at least one of the user sensor of the product dispenser, the tear sensor of the product dispenser, or the other type sensor of the product dispenser that is configured to sense the occurrence of a dispense, the second number of dispenses;

sense, by the time sensor, time data associated with each of the second number of dispenses, wherein the time data comprises at least one of a time associated with each of the second number of dispenses or a time period between each of the second number of dispenses;

determine a second usage rate of the product per user for the second dispensing period, wherein the second usage rate is based on a second accumulated value corresponding to the dispensing parameter for the second number of dispenses and the second number of users; and determine a third value of the dispensing parameter for a third dispensing period based at least in part on the first value, the second value, the first usage rate, and the second usage rate.

21. The product dispenser of claim 20, wherein the controller is configured to determine the third value of the dispensing parameter for the third dispensing period by executing the computer-executable instructions to:

determine that the second value is less than the first value; and determine the third value of the dispensing parameter based at least in part on a comparison of the first usage rate and the second usage rate, wherein a previous value of the dispensing parameter is decreased to obtain the third value responsive to determining that the first usage rate is greater than the second usage rate, the previous value is increased to obtain the third value responsive to determining that the that the first usage rate is less than the second usage rate, or the third value is determined based at least in part on one or more historical values of the dispensing parameter responsive to determining that first usage rate is equal to the second usage rate.

22. The product dispenser of claim 20, wherein the controller is configured to determine the third value of the dispensing parameter for the third dispensing period by executing the computer-executable instructions to:

determine that the second value is greater than the first value; and determine the third value of the dispensing parameter based at least in part on a comparison of the first usage rate and the second usage rate, wherein a previous value of the dispensing parameter is increased to obtain the third value responsive to determining that the first usage rate is greater than the second usage rate, the previous value is decreased to obtain the third value responsive to determining that the that the first usage rate is less than the second usage rate, or the third value is determined based at least in part on one or more historical values responsive to determining that the first usage rate is equal to the second usage rate.

23. The product dispenser of claim 22, wherein the previous value is the second value of the dispensing parameter.

24. The product dispenser of claim 20, wherein the controller is configured to:

determine a first portion of the first number of dispenses, wherein each dispense in the first portion occurred more than a threshold time apart from any other dispense of the first number of dispenses;

determine a second portion of the first number of dispenses, wherein each dispense in the second portion occurred less than the threshold time apart from at least one other dispense in the second portion;

determine a third number of dispenses in the first portion and a fourth number of dispenses in the second portion;

determine a first estimated number of unique users equal to the third number of dispenses;

determine a second estimated number of unique users by dividing the fourth number of dispenses by two to obtain an integer result, wherein the integer result is the second estimated number of unique users; and determine the first number of users by summing the first estimated number of unique users and the second estimated number of unique users.

* * * * *